(12) United States Patent
Awoniyi-Oteri et al.

(10) Patent No.: US 9,474,105 B2
(45) Date of Patent: Oct. 18, 2016

(54) USER EQUIPMENT HAVING A MULTIPLE SUBSCRIBER IDENTITY MODULE CAPABILITY UNDERSTOOD BY ONE OR MORE NETWORKS

(71) Applicant: QUALCOMM Incorporated, San Diego, CA (US)

(72) Inventors: Olufunmilola Awoniyi-Oteri, San Diego, CA (US); Soumya Das, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/603,715

(22) Filed: Jan. 23, 2015

(65) Prior Publication Data

US 2016/0219648 A1    Jul. 28, 2016

(51) Int. Cl.
*G06F 15/16* (2006.01)
*H04W 88/06* (2009.01)
*H04W 72/12* (2009.01)

(52) U.S. Cl.
CPC ......... *H04W 88/06* (2013.01); *H04W 72/1215* (2013.01)

(58) Field of Classification Search
CPC ...... H04W 88/06; H04W 8/26; H04W 48/18
USPC ............ 455/414.1, 414.2, 435.2, 458, 552.1
See application file for complete search history.

(56) References Cited

U.S. PATENT DOCUMENTS

| | | | |
|---|---|---|---|
| 2006/0129638 A1* | 6/2006 | Deakin | H04W 8/22 709/203 |
| 2010/0284333 A1 | 11/2010 | Shirota et al. | |
| 2012/0327912 A1 | 12/2012 | Kirveskoski | |
| 2013/0065644 A1 | 3/2013 | Bishop et al. | |
| 2013/0303203 A1 | 11/2013 | Wang et al. | |
| 2014/0220992 A1 | 8/2014 | Henneberg et al. | |
| 2014/0228039 A1 | 8/2014 | Zhao et al. | |
| 2014/0228070 A1 | 8/2014 | Josso et al. | |
| 2014/0274006 A1 | 9/2014 | Mutya et al. | |
| 2015/0017968 A1 | 1/2015 | Kaikkonen et al. | |
| 2015/0023258 A1 | 1/2015 | Hu et al. | |
| 2016/0219608 A1 | 7/2016 | Awoniyi-Oteri et al. | |

FOREIGN PATENT DOCUMENTS

| | | |
|---|---|---|
| WO | WO-2014070066 A1 | 5/2014 |
| WO | WO-2015000389 A1 | 1/2015 |

OTHER PUBLICATIONS

ISA/EPO, International Search Report and the Written Opinion of the International Searching Authority, Int'l. App. No. PCT/US2015/065320, Mar. 3, 2016, European Patent Office, Rijswijk, NL, 13 pgs.

\* cited by examiner

*Primary Examiner* — Sam Bhattacharya
(74) *Attorney, Agent, or Firm* — Holland & Hart LLP

(57) ABSTRACT

A user equipment (UE) may determine a capability of the UE to support multiple subscriber identity modules (SIMs). The multiple SIMs may enable the UE to communicate with multiple network nodes. The UE may notify at least one network node of the multiple network nodes of the multiple SIM capability of the UE.

30 Claims, 24 Drawing Sheets

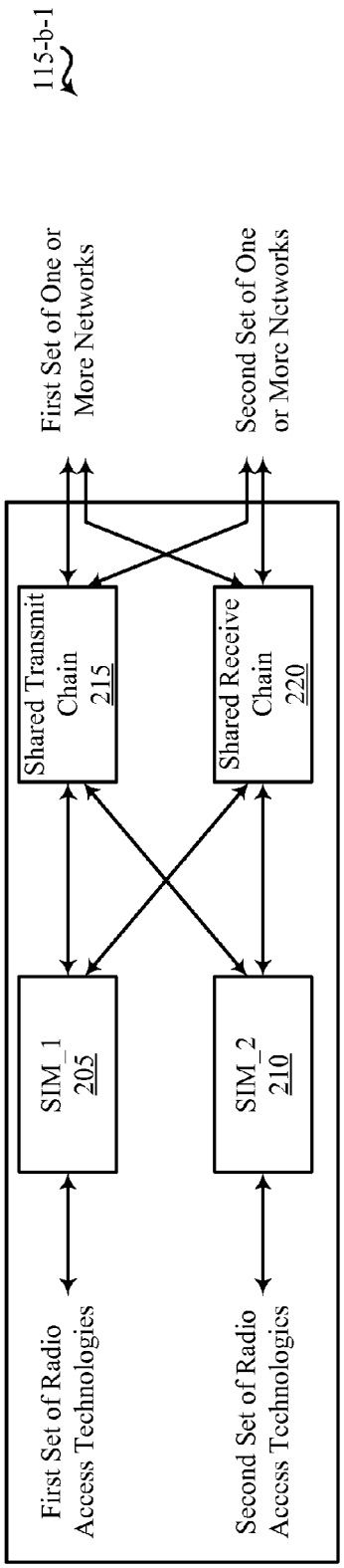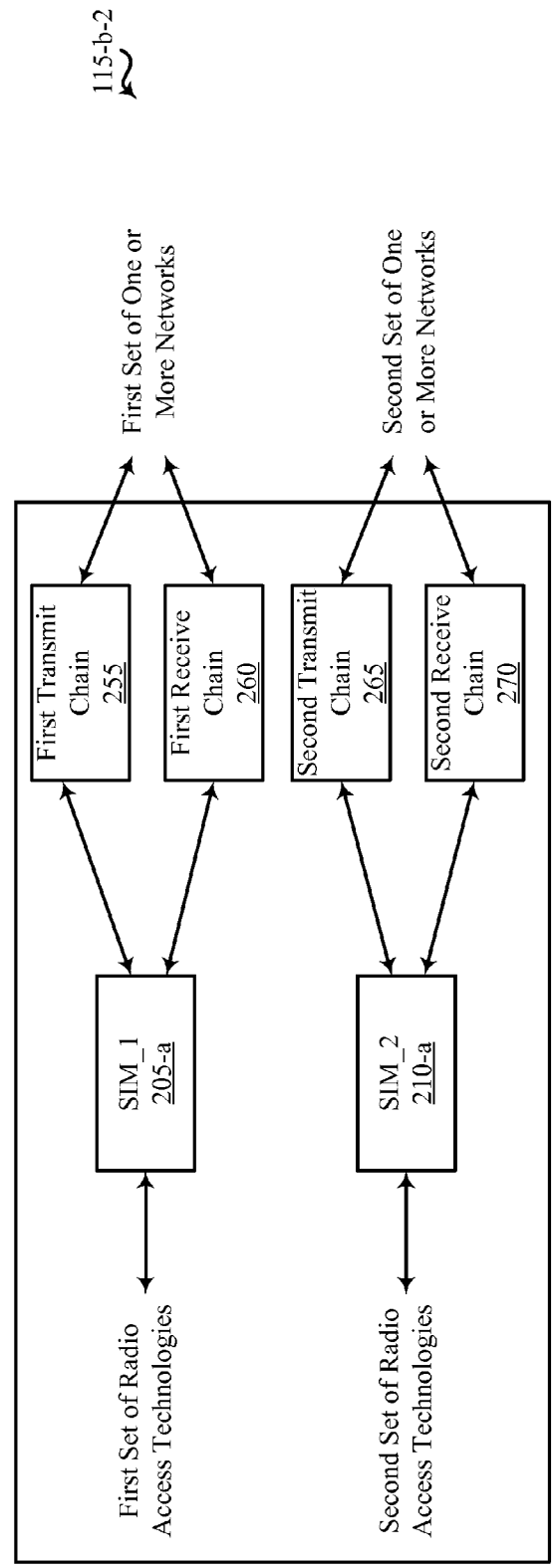
FIG. 2A
FIG. 2B

USER EQUIPMENT HAVING A MULTIPLE SUBSCRIBER IDENTITY MODULE CAPABILITY UNDERSTOOD BY ONE OR MORE NETWORKS

BACKGROUND

1. Field of the Disclosure

The present disclosure, for example, relates to wireless communication systems, and more particularly to a user equipment (UE) having a multiple subscriber identity module (SIM) capability understood by one or more networks.

2. Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations or access points, each simultaneously supporting communication for multiple wireless devices. Base stations or access points may communicate with wireless devices on downstream and upstream links. Each base station or access point has a coverage range, which may be referred to as the coverage area of the cell or access point.

Some wireless devices may have a multiple SIM capability. For example, a wireless device may have a first SIM and a second SIM. The first SIM may be associated with a first subscription for communicating over a first set of one or more networks, and the second SIM may be associated with a second subscription for communicating over a second set of one or more networks.

SUMMARY

In theory, a wireless device having multiple SIMs should be able to communicate over a first network using a first subscription of a first SIM, and simultaneously communicate over a second network using a second subscription of a second SIM. In practice, such simultaneous communication may be constrained by one or more factors. For example, the first and second SIMs may share a transmit or receive chain, meaning the first subscription of the first SIM may be unusable (or constrained in usage) when the shared transmit or receive chain is being used for the second subscription of the second SIM. Similarly, the second subscription of the second SIM may be unusable (or constrained in usage) when the shared transmit or receive chain is being used for the first subscription of the first SIM. In another example, each of the SIMs in a device having multiple SIMs may be provided with dedicated transmit and receive chains, but use of the transmit or receive chain associated with one of the SIMs may trigger radio frequency (RF) impairments in the transmit or receive chain associated with the other SIM. Thus, the transmit or receive chain associated with one SIM may need to be blanked (e.g., not used) when using the transmit or receive chain associated with the other SIM.

A network that is unaware of a wireless device's multiple SIM capability, or the constraints associated therewith, may communicate with the wireless device using communication parameters and transmission/reception schedules that interfere with the wireless device's use of its multiple SIMs. Some of the techniques described in the present disclosure therefore enable a wireless device to notify one or more networks of its multiple SIM capability. Other techniques disclosed in the present disclosure enable a network node to modify one or more communication parameters for a wireless device based on the device's multiple SIM capability.

In a first set of illustrative examples, a method for wireless communication is described. In one configuration, the method may include determining a capability of a UE to support multiple SIMs. The multiple SIMs enable the UE to communicate with multiple network nodes. The method may also include notifying at least one network node of the multiple network nodes of the multiple SIM capability of the UE.

In some examples of the method, notifying the at least one network node may include sending an indication of a physical characteristic of the UE associated with the multiple SIMs. The physical characteristic may include, for example, at least one of a number of SIMs in the UE, a number of transmit chains available in the UE, a number of receive chains available in the UE, a number of transmit chains available per SIM in the UE, a number of receive chains available per SIM in the UE, an indication of transmit chain sharing, an indication of receive chain sharing, or a combination thereof.

In some examples of the method, notifying the at least one network node may include sending scheduling information associated with the multiple SIMs. The scheduling information may include, for example, at least one of uplink scheduling information, downlink scheduling information, power savings scheduling information, or a combination thereof.

In some examples of the method, notifying the at least one network node may include sending at least one of application information associated with the multiple SIMs, impairment information associated with the multiple SIMs, channel information associated with the multiple SIMs, performance information associated with the multiple SIMs, or a combination thereof. The application information may include, for example, at least one of applications supported per SIM in the UE, application priority information, an application layer buffer status, an application quality of service (QoS), or a combination thereof. The impairment information may include, for example, at least one of a transmit blanking schedule, a receive blanking schedule, or a combination thereof. The channel information may include, for example, at least one of a channel estimation, a pathloss, or a combination thereof. The performance information may include, for example, at least one of a transmit performance metric, a target transmit blanking rate, a target uplink channel frame error ratio (FER), a receive performance metric, a measured downlink channel block error rate (BLER), a measured downlink channel FER, a measured downlink channel mean opinion score (MOS), a measured downlink channel throughput, a measured downlink channel latency, a measured downlink channel jitter, a semi-static performance metric, a dynamic performance metric, an application-specific performance metric, or a combination thereof.

In some examples of the method, notifying the at least one network node may include indicating a preferred slot for voice communication. The preferred slot may be based on at least one of a receive parameter of a non-voice transmission, a transmit parameter of a non-voice transmission, or a combination thereof.

In some examples of the method, notifying the at least one network node may include indicating a frame skip pattern for voice applications of the UE. In these examples, the method may further include adapting the frame skip pattern based on channel conditions and performance metrics of the multiple network nodes.

In some examples, the method may include receiving a response from the at least one network node based on the notification, and modifying a communication parameter of the UE based on the response. In some examples, the response from the at least one network node may include an uplink channel performance metric. The communication parameter may include, for example, at least one of a downlink scheduling parameter, an uplink scheduling parameter, a timer, a transmit blanking parameter, a receive blanking parameter, an application prioritization parameter, an RRC state, an MCS-related parameter, a paging occasion, or a combination thereof.

In some examples, the method may include receiving a coordination message from the at least one network node. The coordination message may be based on the notification. In these examples, the method may include forwarding the coordination message to at least one other network node of the multiple network nodes. The coordination message may then be utilized by the at least one other network node to coordinate communications with the UE and the at least one network node. In some examples, the at least one network node may be associated with a first provider, and the at least one other network node is associated with a second provider.

In a second set of illustrative examples, an apparatus for wireless communication is described. In one configuration, the apparatus may include means for determining a capability of a UE to support multiple SIMs. The multiple SIMs enable the UE to communicate with multiple network nodes. The apparatus may also include means for notifying at least one network node of the multiple network nodes of the multiple SIM capability of the UE. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a SIM management module to determine a capability of a UE to support multiple SIMs. The multiple SIMs enables the UE to communicate with multiple network nodes. The apparatus may also include a UE capability notification module to notify at least one network node of the multiple network nodes of the multiple SIM capability of the UE. In some examples, the apparatus may also include a module or modules to implement one or more aspects of the method for wireless communication described above with respect to the first set of illustrative examples.

In a fourth set of illustrative examples, a non-transitory computer-readable medium storing computer-executable code for wireless communication is described. In one configuration, the code may be executable by a processor to determine a capability of a UE to support multiple SIMs. The multiple SIMs enable the UE to communicate with multiple network nodes. The code may also be executable by the processor to notify at least one network node of the multiple network nodes of the multiple SIM capability of the UE. In some examples, the code may also be executable by the processor to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 2A shows a first exemplary UE having multiple SIMs, in accordance with various aspects of the present disclosure;

FIG. 2B shows a second exemplary UE having multiple SIMs, in accordance with various aspects of the present disclosure;

DETAILED DESCRIPTION

Figure 1:
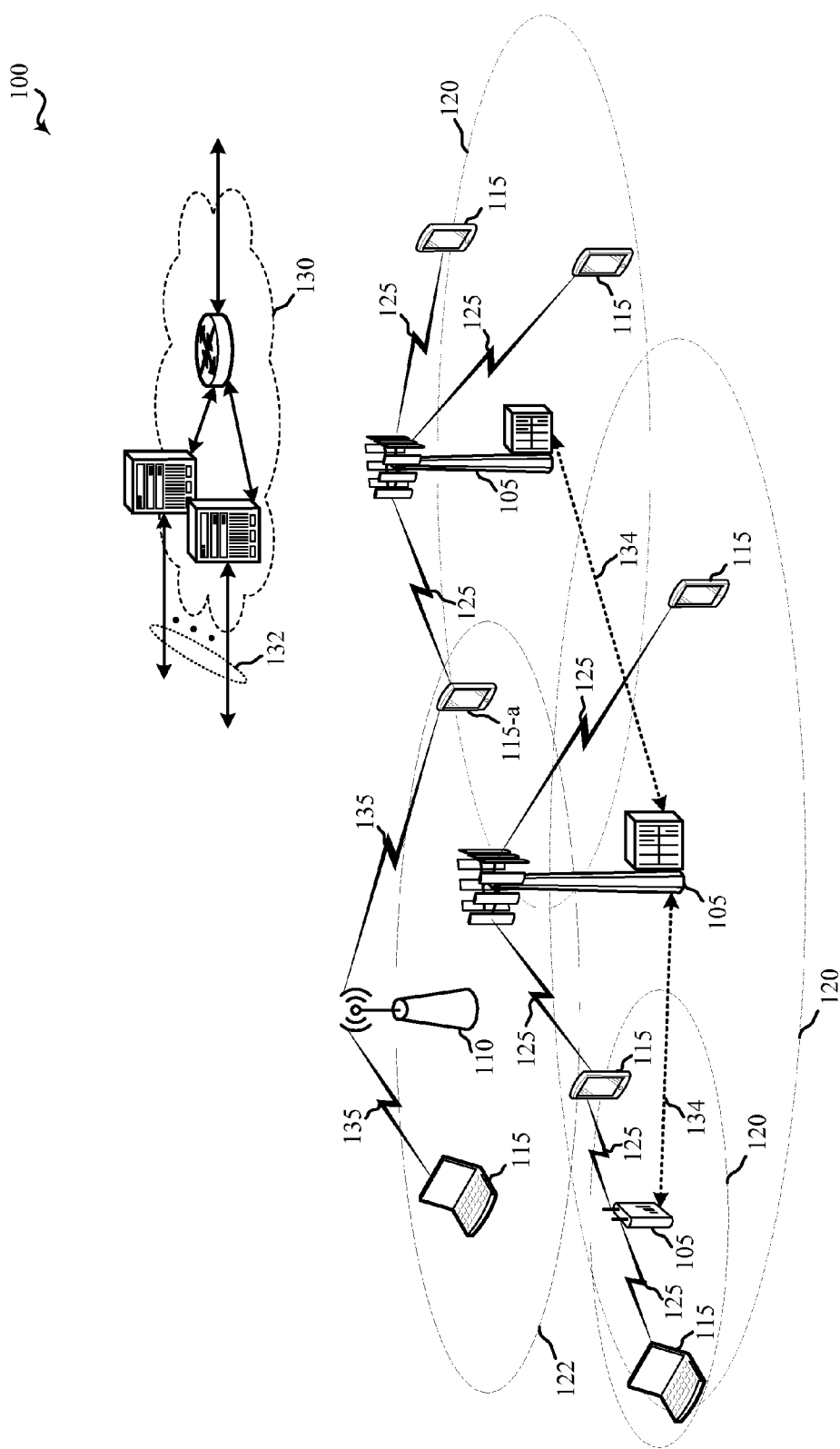
FIG. 1, a system diagram illustrates an example of a wireless communications system, in accordance with various aspects of the present disclosure.

A wireless device having multiple SIMs should be able to communicate over a first network using a first subscription of a first SIM, and simultaneously communicate over a second network using a second subscription of a second SIM. However, such simultaneous communication may be constrained by one or more factors. For example, the first and second SIMs may share a transmit or receive chain, meaning the first subscription of the first SIM may be unusable (or constrained in usage) when the shared transmit or receive chain is being used for the second subscription of the second SIM. Similarly, the second subscription of the second SIM may be unusable (or constrained in usage) when the shared transmit or receive chain is being used for the first subscription of the first SIM. In another example, each of the SIMs in a device having multiple SIMs may be provided with dedicated transmit and receive chains, but use of the transmit or receive chain associated with one of the SIMs may trigger RF impairments in the transmit or receive chain associated with the other SIM. Thus, the transmit or receive chain associated with one SIM may need to be blanked (e.g., not used) when using the transmit or receive chain associated with the other SIM.

One way to satisfy the constraints under which the SIMs of a multiple SIM wireless device may operate is to locally schedule use of a device's multiple SIMs at the device. The local scheduling may be based on local information such as the number of SIMs in use, the radio access technologies used with the SIMs, application prioritizations, application QoS expectations, etc. The local scheduling may also be based on available resources (e.g., the number of available transmit and receive chains). However, the effectiveness of local scheduling in optimizing multiple SIM use is limited, because a network that is unaware of a wireless device's multiple SIM capability, or the constraints associated therewith, may communicate with the wireless device using communication parameters and transmission/reception schedules that interfere with the wireless device's use (and local scheduling) of its multiple SIMs.

The techniques disclosed in the present disclosure may improve the use of a wireless device's multiple SIMs by enabling the wireless device to notify one or more networks of its multiple SIM capability, and by enabling the networks so notified to modify, based on the device's multiple SIM capability, one or more communication parameters for the wireless device.

Techniques described herein may be used for various wireless communications systems such as CDMA, TDMA, FDMA, OFDMA, single-carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a system diagram illustrates an example of a wireless communications system 100, in accordance with various aspects of the present disclosure. The wireless communications system 100 may include base station(s) 105, access point(s) (AP) 110, and mobile devices such as UEs 115. The AP 110 may provide wireless communications via a WLAN radio access network (RAN) such as, e.g., a network implementing at least one of the IEEE 802.11 family of standards. The AP 110 may provide, for example, WLAN or other short range (e.g., Bluetooth and Zigbee) communications access to an access terminal (AT) such as UE 115. Each AP 110 has a geographic coverage area 122 such that UEs 115 within that area can typically communicate with the AP 110. UEs 115 may be multi-access mobile devices that communicate with the AP 110 and a base station 105 via different radio access networks. The UEs 115, such as mobile stations, personal digital assistants (PDAs), other handheld devices, netbooks, notebook computers, tablet computers, laptops, display devices (e.g., TVs, computer monitors, etc.), printers, etc., may be stationary or mobile and traverse the geographic coverage areas 122 and/or 120, the geographic coverage areas of an AP 110 and a base station 105. While one AP 110 is illustrated, the wireless communications system 100 may include multiple APs 110. Some or all of the UEs 115 may associate and communicate with an AP 110 via a communication link 135 and/or with a base station 105 via a communication link 125.

The wireless communications system 100 may also include a core network 130. The core network 130 may provide user authentication, access authorization, tracking, Internet Protocol (IP) connectivity, and other access, routing, or mobility functions. The base stations 105 interface with the core network 130 through backhaul links 132 (e.g., 51, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

A UE 115 can be covered by more than one AP 110 and/or base station 105 and can therefore associate with multiple APs 110 or base stations 105 at different times. For example, a single AP 110 and an associated set of UEs 115 may be referred to as a basic service set (BSS). An extended service set (ESS) is a set of connected BSSs. A distribution system (DS) (not shown) is used to connect APs 110 in an extended service set. A geographic coverage area 122 for an access point 110 may be divided into sectors making up a portion of the geographic coverage area (not shown). The wireless communications system 100 may include APs 110 of different types (e.g., metropolitan area, home network, etc.), with varying sizes of coverage areas and overlapping coverage areas for different technologies. Although not shown, other wireless devices can communicate with the AP 110.

The base stations 105 may wirelessly communicate with the UEs 115 via base station antennas. Each of the base station 105 sites may provide communication coverage for a respective geographic coverage area 120. In some examples, base stations 105 may be referred to as a base transceiver station, a radio base station, a radio transceiver, a NodeB, eNodeB (eNB), Home NodeB, a Home eNodeB, or some other suitable terminology. The geographic coverage area 120 for a base station 105 may be divided into sectors making up a portion of the coverage area (not shown). The wireless communications system 100 may include base stations 105 of different types (e.g., macro and/or small cell base stations). There may be overlapping geographic coverage areas 120/122 for different technologies.

In some examples, the wireless communications system 100 may include portions of an LTE/LTE-A network. In LTE/LTE-A networks, the term evolved Node B (eNB) may be generally used to describe the base stations 105, while the term UE may be generally used to describe the mobile devices (i.e., UEs 115). The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs with service subscriptions with the network provider. A small cell may be a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). A femto cell may also or alternatively provide unrestricted or hybrid access by UEs (e.g., restricted access by some UEs and unrestricted access by other UEs). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network supporting radio bearers for the user plane data. At the Physical (PHY) layer, the transport channels may be mapped to Physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, APs, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Similarly, communication links 135, also shown in wireless communications system 100, may include UL transmissions from a UE 115 to an access point 110, and/or DL transmissions from an access point 110 to a UE 115.

In some embodiments of the system 100, base stations 105, APs 110, and/or UEs 115 may include multiple antennas for employing antenna diversity schemes to improve communication quality and reliability between base stations 105, APs 110, and UEs 115. Additionally or alternatively, base stations 105, APs 110, and/or UEs 115 may employ multiple-input, multiple-output (MIMO) techniques that may take advantage of multi-path environments to transmit multiple spatial layers carrying the same or different coded data.

System 100 includes a UE 115-a which is in communication with both a base station 105 and an access point 110. As an example, UE 115-a may communicate with the access point 110 using Wi-Fi or other WLAN communications, while the UE 115-a may communicate with the base stations 105 using LTE, GSM, or other WWAN communications. The communications may be at the same time. As an example, the UE 115-a may be a dual-SIM, dual-active (DSDA) or multiple-SIM, multiple active (MSMA) device and may communicate with one base station 105 using LTE communications, another base station 105 using GSM communications, and an access point 110 using Wi-Fi communications. As another example, the UE 115-a may communicate with one base station 105 using LTE communications, the same base station 105 using GSM communications, and an access point 110 using Wi-Fi communications.

FIG. 2A shows a first exemplary UE 115-b-1 having multiple SIMs, in accordance with various aspects of the present disclosure. The UE 115-b-1 may be an example of aspects of one of the UEs 115 described with reference to FIG. 1. By way of example, the UE 115-b-1 is shown to have a first SIM 205 (e.g., SIM_1), a second SIM 210 (e.g., SIM_2), a shared transmit chain 215, and a shared receive chain 220. The first SIM 205 may be associated with a first subscription for communicating over a first set of one or more networks, and the second SIM 210 may be associated with a second subscription for communicating over a second set of one or more networks. By way of example, the first subscription may be a GSM voice subscription, and the second subscription may be a voice or data LTE, WCDMA, TD-SCDMA, 1xEV-DO, GSM, or Wi-Fi subscription. The first and second subscriptions may be with the same or different providers.

The shared transmit and receive chains 215, 220 may reduce the cost or complexity of the UE 115-b-1. However, the shared transmit and receive chains 215, 220 may also limit the transmission and reception capabilities supported by one or both of the SIMs 205, 210. For example, when the shared transmit chain 215 is in use by the first SIM 205, radio access technologies supported by the second SIM 210 may be blanked from transmitting (i.e., not allowed to use the shared transmit chain 215), or the UE 115-b-1 may be prevented from transmitting to networks accessible via the subscription of the second SIM 210. Similarly, when the shared transmit chain 215 is in use by the second SIM 210, radio access technologies supported by the first SIM 205 may be blanked from transmitting, or the UE 115-b-1 may be prevented from transmitting to networks accessible via the subscription of the first SIM 205. When the shared receive chain 220 is in use by the first SIM 205, radio access technologies supported by the second SIM 210 may be blanked from receiving (i.e., not allowed to use the shared receive chain 220), or the UE 115-b-1 may be prevented from receiving from networks accessible via the subscription of the second SIM 210. Similarly, when the shared receive chain 220 is in use by the second SIM 210, radio access technologies supported by the first SIM 205 may be blanked from receiving, or the UE 115-b-1 may be prevented from receiving from networks accessible via the subscription of the second SIM 210.

The blanking of transmission or reception via a particular radio access technology (or to/from a particular network) can lead to significant degradation in the performance of application(s) supported by the particular radio access technology or network. For example, when the first SIM 205 is given priority of access to the shared transmit and receive chains 215, 220, for the purpose of supporting a GSM voice call, the throughput of an LTE data transmission received by an application supported by the second SIM 210, at the time of the GSM voice call, may be seriously degraded (e.g., due to blanking of LTE reception).

FIG. 2B shows a second exemplary UE 115-b-2 having multiple SIMs, in accordance with various aspects of the present disclosure. The UE 115-b-2 may be an example of aspects of one of the UEs 115 described with reference to FIG. 1. By way of example, the UE 115-b-2 is shown to have a first SIM 205-a and a second SIM 210-a. The first SIM 205-a may be associated with a first subscription for communicating over a first set of one or more networks, and the second SIM 210-a may be associated with a second subscription for communicating over a second set of one or more networks. By way of example, the first subscription may be a GSM voice subscription, and the second subscription may be a voice or data LTE, WCDMA, TD-SCDMA, 1×EV-DO, GSM, or Wi-Fi subscription. The first and second subscriptions may be with the same or different providers.

The first SIM 205-a is shown to have access to a first transmit chain 255 and a first receive chain 260, while the second SIM 205-b is shown to have access to a second transmit chain 265 and a second receive chain 270. In theory, a first set of one or more applications can use the first subscription of the first SIM 205-a to transmit or receive via the first transmit chain 255 and the first receive chain 260, while a second set of one or more applications can simultaneously use the second subscription of the second SIM 210-a to transmit or receive via the second transmit chain 265 and the second receive chain 270. However, in practice, simultaneous use of some of the chains may lead to RF impairments for certain transmissions or receptions. To mitigate these RF impairments, and by way of example, use of the first transmit chain 255 may be blanked to avoid RF impairment of a reception via the second receive chain 270. Similarly, use of the second transmit chain 265 may be blanked to avoid RF impairment of a reception via the first receive chain 260. Use of the first receive chain 260 may also be blanked to avoid RF impairment of a transmission via the second transmit chain 265. Similarly, use of the second receive chain 270 may be blanked to avoid RF impairment of a transmission via the first transmit chain 255.

FIGS. 2A & 2B illustrate two embodiments of a UE 115-b having a multiple SIM capability. In other embodiments of a UE having multiple SIM capability, a UE may have more than two SIMs, or a UE may have two or more SIMs associated with a shared receive chain and independent transmit chains, or a UE may have two or more SIMs associated with a shared transmit chain and independent receive chains. Regardless of a multiple SIM UE's configuration, there may be scenarios in which the radio access technology(ies), application(s), or network(s) associated with the subscription of one SIM suffer from degraded performance or loss of network access based on the activity of the radio access technology(ies), application(s), or network(s) associated with the subscription of another SIM, or there may arise scenarios in which network knowledge of the UE's multiple SIMs would assist in improving the scheduling and/or performance of the multiple SIM UE.

A network node (e.g., a base station) communicating with a multiple SIM UE such as one of the UEs 115-b described with reference to FIG. 2A or 2B, via one subscription of the UE (e.g., the first subscription supported by the first SIM 205 or the second subscription supported by the second SIM 210) may communicate with the UE 115-b without knowledge of the UE's multiple SIM capability. The network node may therefore schedule the UE 115-b to transmit or receive at times that the UE 115-b is unable to transmit or receive using the subscription via which the UE 115-b communicates with the network node (e.g., due to blanking) The present disclosure therefore describes techniques for notifying one or more network nodes of the multiple SIM capability of a UE, and for modifying a communication parameter of the UE or a network node based on the notification. By way of example, a UE may notify a network node of its multiple SIM capability at an RF level, a SIM level, or an application level.

In some examples, a notification concerning a UE's multiple SIM capability may include at least one of an indication of a physical characteristic of the UE, scheduling information associated with the multiple SIMs, application information associated with the multiple SIMs, impairment information associated with the multiple SIMs, channel information associated with the multiple SIMs, performance information associated with the multiple SIMs, or a combination thereof.

Upon receiving a notification of a UE's multiple SIM capability, a network node may modify a communication parameter of the network node, request or instruct the UE to modify a communication parameter of the UE, or coordinate with another network node (e.g., a network node in communication with the UE via a different SIM of the UE) to modify a communication parameter of the network node or the other network node. The modified communication parameter(s) may improve the performance of one or more applications supported by the UE, for example, or reduce the burden placed on the UE to manage its use of limited resources (e.g., shared transmit or receive chains), or address RF impairments at the UE.

Figure 3:
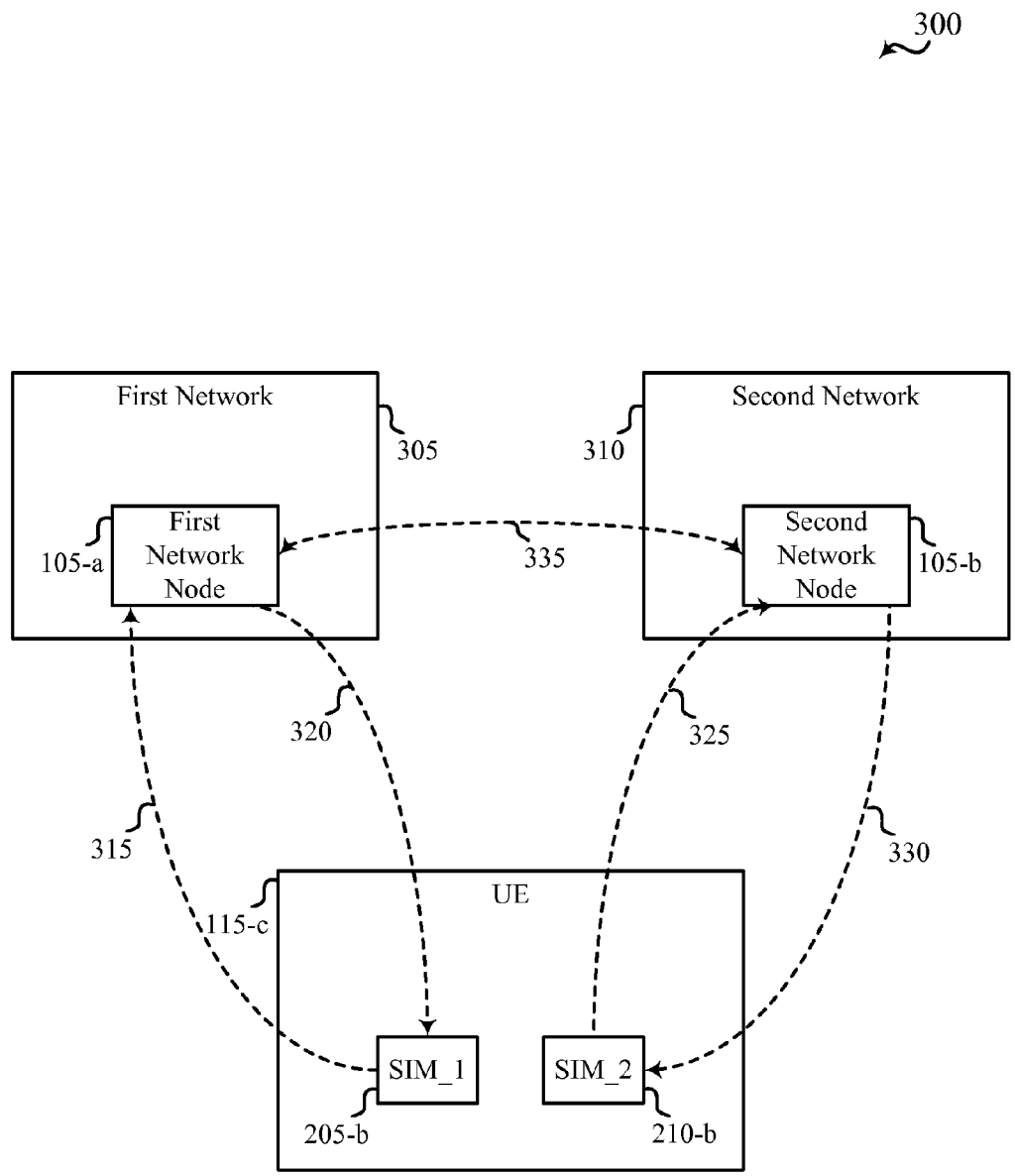
FIG. 3 shows an exemplary wireless communication system, in accordance with various aspects of the present disclosure.

FIG. 3 shows an exemplary wireless communication system 300, in accordance with various aspects of the present disclosure. The wireless communication system 300 may include a UE 115-c having multiple SIMs, including a first SIM 205-b and a second SIM 210-b. The UE 115-c may be an example of aspects of one of the UEs 115 described with reference to FIG. 1, 2A, or 2B. By way of example, the first SIM 205-b may be associated with a first subscription for communicating over a first network 305 via a first network node 105-a, and the second SIM 210-b may be associated with a second subscription for communicating over a second network 310 via a second network node 105-b. By way of example, the first subscription may be a GSM voice subscription, and the second subscription may be a voice or data LTE/LTE-A, WCDMA, TD-SCDMA, 1×EV-DO, GSM, or Wi-Fi subscription. The first and second subscriptions may be with the same or different providers.

As shown in FIG. 3, the UE 115-c may transmit control signals or data to the first network 305 via a first communication link 315, and receive control signals or data from the first network 305 via a second communication link 320. Similarly, the UE 115-c may transmit control signals or data to the second network 310 via a third communication link 325, and receive control signals or data from the second network via a fourth communication link 330. The UE 115-c may notify the first network node 105-a of the multiple SIM capability of the UE 115-c via the first communication link 315, or may notify the second network node 105-b of the multiple SIM capability of the UE 115-c via the third communication link 325. The communication links may be examples of the communication links 125, 135 described with reference to FIG. 1.

In some examples, a notification concerning the UE's multiple SIM capability may include an indication of a physical characteristic of the UE 115-c. The physical characteristic may include, for example, at least one of a number of SIMs in the UE 115-c, a number of transmit chains available in the UE 115-c, a number of receive chains available in the UE 115-c, a number of transmit chains available per SIM in the UE 115-c, a number of receive chains available per SIM in the UE 115-c, an indication of transmit chain sharing, an indication of receive chain sharing, or a combination thereof. When a notification is transmitted to a network node (e.g., the first network node 105-a), the number of transmit chains available per SIM in the UE 115-c, or the number of receive chains available per SIM in the UE 115-c, may include the number of transmit or receive chains available to each SIM or the number of transmit or receive chains available to other SIMs (e.g., the second SIM 210-b).

In some examples, a notification concerning the UE's multiple SIM capability may include scheduling information associated with the multiple SIMs 205-b, 210-b. The scheduling information may include, for example, at least one of uplink scheduling information, downlink scheduling information, power savings scheduling information (e.g., discontinuous transmission (DTX) scheduling information), or a combination thereof. The UE's scheduling information may in some cases be based on one or more uplink or downlink modulation and coding schemes (MCSs), which MCS(s) may be included in a notification concerning the UE's multiple SIM capability.

In some examples, a notification concerning the UE's multiple SIM capability may include application information associated with the multiple SIMs 205-b, 210-b. The application information may include, for example, at least one of applications supported per SIM in the UE 115-c, application priority information, an application layer buffer status, an application QoS, or a combination thereof. When a notification is transmitted to a network node (e.g., the first network node 105-a), the applications supported per SIM in the UE 115-c may include the applications supported by each SIM or the applications supported by other SIMs (e.g., the second SIM). A notification including applications supported by other SIMs may be sufficient when a network node communicating with a UE 115-c, via a subscription associated with one SIM, already knows the application supported by the SIM that supports the network node's communications with the UE 115-c.

In some examples, a notification concerning the UE's multiple SIM capability may include impairment information associated with the multiple SIMs 205-b, 210-b. The impairment information may include, for example, at least one of a transmit blanking schedule, a receive blanking schedule, or a combination thereof. In some cases, the impairment information may include types of impairments, or UE configurations (e.g., resource usages) that result in impairments.

In some examples, a notification concerning the UE's multiple SIM capability may include channel information associated with the multiple SIMs 205-b, 210-b. The channel information may include, for example, at least one of a channel estimation, a pathloss, or a combination thereof.

In some examples, a notification concerning the UE's multiple SIM capability may include performance information associated with the multiple SIMs 205-b, 210-b. The performance information may include, for example, at least one of a transmit performance metric, a target transmit blanking rate, a target uplink channel FER, or a receive performance metric. For a voice communication, the performance information may include, for example, at least one of a measured downlink channel BLER, a measured downlink channel FER, or a measured downlink channel MOS. For a data communication, the performance information may include, for example, at least one of a measured downlink channel throughput, a measured downlink channel latency, or a measured downlink channel jitter. The performance information may also or alternatively include a semi-static performance metric, a dynamic performance metric, or an application-specific performance metric.

After notifying the first network node of the multiple SIM capability of the UE 115-c (e.g., via the first communication link 315), the first network node 105-a may use information received with the notification to modify a communication parameter of the first network node 105-a. Also or alternatively, the first network node 105-a may request or instruct the UE 115-c (e.g., via the second communication link 320) to modify a communication parameter of the UE 115-c. Also or alternatively, the first network node 105-a may coordinate with the second network node 105-b to modify a communication parameter of the first network node 105-a or the second network node 105-b.

The communication parameter(s) modified by the first network node 105-a or the second network node 105-b may include, for example, at least one of a downlink scheduling parameter, an uplink scheduling parameter, a timer (e.g., a transmission schedule timer), a transmit blanking parameter, a receive blanking parameter, an application prioritization parameter, an RRC state, an MCS-related parameter (e.g., an enhanced dedicated channel (E-DCH) Transport Format Combination Indicator (ETFCI)), a paging occasion, or a combination thereof. The communication parameter(s) may also include, for example, a preferred slot for voice communication, or a frame skip pattern for voice applications, as described in more detail with reference to FIGS. 4-6.

In addition to (or instead of) requesting or instructing the UE 115-c to modify a communication parameter, the first or second network node 105-a, 105-b may transmit to the UE 115-c information such as an uplink channel performance metric, or other information that may be used by the UE 115-c to improve scheduling or use of its first subscription and its first SIM 205-b or its second subscription and its second SIM 210-b.

When coordinating with the second network node 105-b, the first network node 105-a may, in some cases, communicate directly with the second network node 105-b (e.g., over a fifth communication link 335, such as a backhaul link). Similarly, the second network node 105-b may communicate directly with the first network node 105-a. Direct communication between the first and second network nodes 105-a, 105-b may be supported, for example, when the first and second network nodes 105-a,105-b are operated by the same provider, or when the UE 115-c identifies the second network node 105-b to the first network node 105-a and the first network node 105-a is capable of establishing communication with the second network node 105-b. The first network node 105-a may also establish communication with the second network node 105-b (or vice versa) indirectly (e.g., via an intermediary node such as the UE 115-c or an authentication server). When the UE 115-c serves as the intermediary node for communication between the first network node 105-a and the second network node 105-b, the first network node 105-a may communicate with the UE 115-c via the second communication link 320, and the UE 115-c may communicate with the second network node 105-b via the third communication link 325; or, the second network node 105-b may communicate with the UE 115-c via the fourth communication link 330 and the UE 115-c may communicate with the first network node 105-a via the first communication link 315. Communication between the first network node 105-a and the second network node 105-b via an intermediary node may provide better inter-network or UE security.

When network nodes (e.g., the first and second network nodes 105-a, 105-b) coordinate their modification of one or more communication parameters for the UE 115-c, one or more of the network nodes 105-a, 105-b may schedule downlink transmissions such that acknowledgements (ACKs) transmitted by the UE 115-c do not collide with a transmit blanking schedule of the UE 115-c (assuming that the UE 115-c can transmit its transmit blanking schedule for one network, to the other network, in a format (or with a timing reference) that the other network can understand). Network coordination may also provide additional scheduling opportunities for a network. For example, the second network's discovery of the timing of silence insertion descriptor (SID) frames appearing in listen bursts during a GSM voice call carried by the first network 305 may enable the second network 310 to schedule the UE 115-c for communications with the second network 310 during the SID frames.

Whether communication between the first network node 105-a and the second network node 105-b is conducted directly or indirectly, the communication may involve the exchange or transmission of one or more coordination messages. In some embodiments, a coordination message may include macro information. In some embodiments, a coordination message may include micro information. Macro information may include information compiled over more than one frame (e.g., a radio frame) or transmission time interval (TTI), and may be appropriate when the first and second network nodes 105-a, 105-b belong to different networks or are operated by different providers (e.g., because of the increased propagation delay between networks or providers). Micro information may include information compiled over a single frame or TTI, or over a partial frame or TTI, and may be appropriate when the first and second network nodes 105-a, 105-b belong to the same network or are operated by the same provider. In either case, a coordination message may include information particular to the UE 115-c, such as UE scheduling information or UE configuration information. UE configuration information may include, for example, a selection of the radio access technology(ies) to be used by one or more of the SIMS 205-b, 210-b of the UE 115-c, which radio access technology(ies) may mitigate RF impairments for the UE 115-c as the UE 115-c communicates with the first and second networks 305, 310.

In some embodiments, a network node may trigger a UE-assisted security procedure (e.g., an authentication and authorization procedure) before exchanging UE scheduling information or UE configuration information with another network node. In some embodiments, the UE-assisted security procedure may be performed using a third party entity, such as an authentication, authorization, and accounting (AAA) server.

Figure 4:
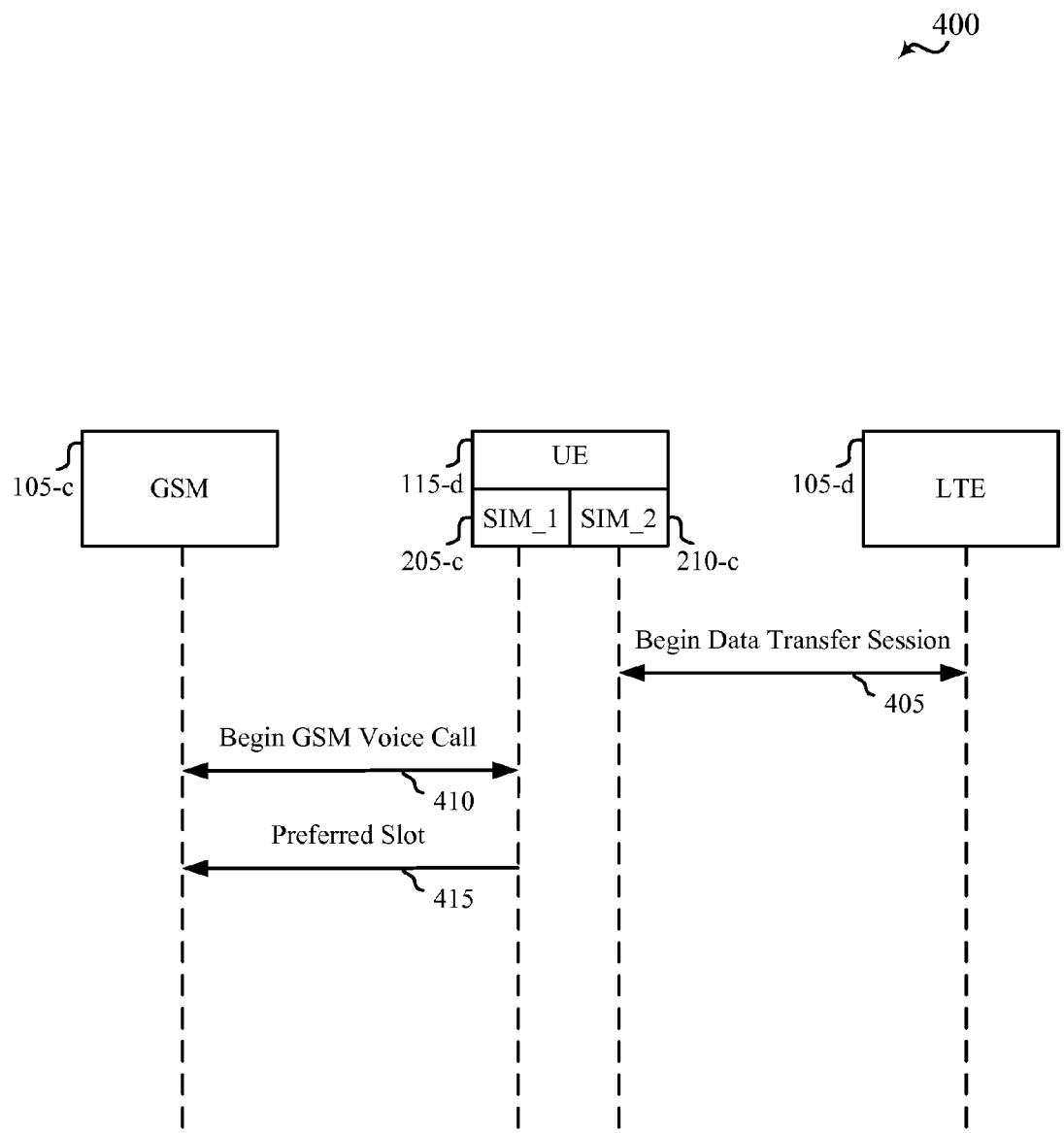
FIG. 4 shows a first exemplary message flow between a multiple SIM UE, a first network node, and a second network node, in accordance with various aspects of the present disclosure.

FIG. 4 shows a first exemplary message flow 400 between a multiple SIM UE 115-d, a first network node 105-c, and a second network node 105-d, in accordance with various aspects of the present disclosure. The UE 115-d may be an example of aspects of one of the UEs 115 described with reference to FIG. 1, 2A, 2B, or 3. By way of example, the UE 115-d may have a first SIM 205-c and a second SIM 210-c. The first SIM 205-c may be associated with a first subscription for communicating over a first network (e.g., via the first network node 105-c), and the second SIM may be associated with a second subscription for communicating over a second network (e.g., via the second network node 105-d). By way of example, the first subscription may be a GSM voice subscription, and the second subscription may be a voice or data LTE/LTE-A, WCDMA, TD-SCDMA, 1×EV-DO, GSM, or Wi-Fi subscription (abbreviated as "LTE" with reference to the second network node 105-f shown in FIG. 4). The first and second subscriptions may be with the same or different providers.

At 405, an application of the UE 115-d may begin a data transfer session with the second network node 105-d. The application may rely on the second subscription, associated with the second SIM 210-c, to establish communication with the second network node 105-d.

At 410, the UE 115-d may initiate a GSM voice call with the first network node 105-c. The GSM voice call may rely on the first subscription associated with the first SIM 205-c. By way of example, the GSM voice call is shown to begin after the data transfer session that begins at 405. However, the GSM voice call may also begin before the data transfer session, or the GSM voice call and data transfer session may be set up in parallel. Before, during, or after setup of the GSM voice call, the UE 115-d may indicate to the first network node 105-c (e.g., in a flag) which of eight GSM slots in a GSM frame is a preferred slot 415 for voice communication. The preferred slot may be based on at least one of a receive parameter of a non-voice transmission (e.g., the data transfer session with the second network node), a transmit parameter of a non-voice transmission (e.g., the data transfer session with the second network node), or a combination thereof. The preferred slot may be selected to reduce transmit blanking, receive blanking, or RF impairments that may affect a non-voice transmission (e.g., the data transfer session with the second network node 105-d). In some examples, the preferred slot may be indicated using one or more reserved bits in an existing message type. For example, in an 8-bit field where each bit corresponds to a different GSM slot, a preferred slot may be indicated by setting one of the eight bits to a logic one. In some examples, the UE 115-d may indicate a preferred slot for GSM voice transmission and a preferred slot for GSM voice reception. In some examples, the indication(s) of the preferred slot(s) 415 may serve to notify the first network node 105-c that the UE 115-d has multiple SIMs.

The message flow shown in FIG. 4 may be useful, for example, when the UE 115-d makes lean usage of the first subscription of its first SIM 205-c (e.g., GSM voice), such that use (or non-impaired use) of the UE's transmit and receive chains by radio access technologies or applications using the second subscription of the second SIM 210-c may be time domain multiplexed with use of the UE's transmit and receive chains by the GSM voice call supported by the first subscription of the first SIM 205-c.

In a Voice services over Adaptive Multi-user channels on One Slot II (VAMOS-II) system, in which two calls may be multiplexed into one time slot, a UE such as the UE 115-d may notify the first network node 105-c of its multiple SIM capability, and the first network node 105-c may determine a GSM slot or slots to be used for transmissions or receptions to the UE 115-d. If the UE 115-d belongs to (or is assigned to) a first set of UEs, the first network may allocate the UE 115-d a static slot or slots for GSM voice transmission or reception (e.g., the slot or slots may remain the same from one GSM frame to another). If the UE 115-d belongs to (or is assigned to) a second set of UEs, the first network may dynamically allocate the UE 115-d a slot or slots that are multiplexed with the static slot or slots allocated to the first set of UEs. Regardless of whether a slot or slots are allocated statically or dynamically, a slot or slots may be allocated to the UE 115-d based on the use of the subscription of the second SIM 210-c. An allocated slot or slots may be signaled to the UE 115-d by the first network node 105-c.

Figure 5:
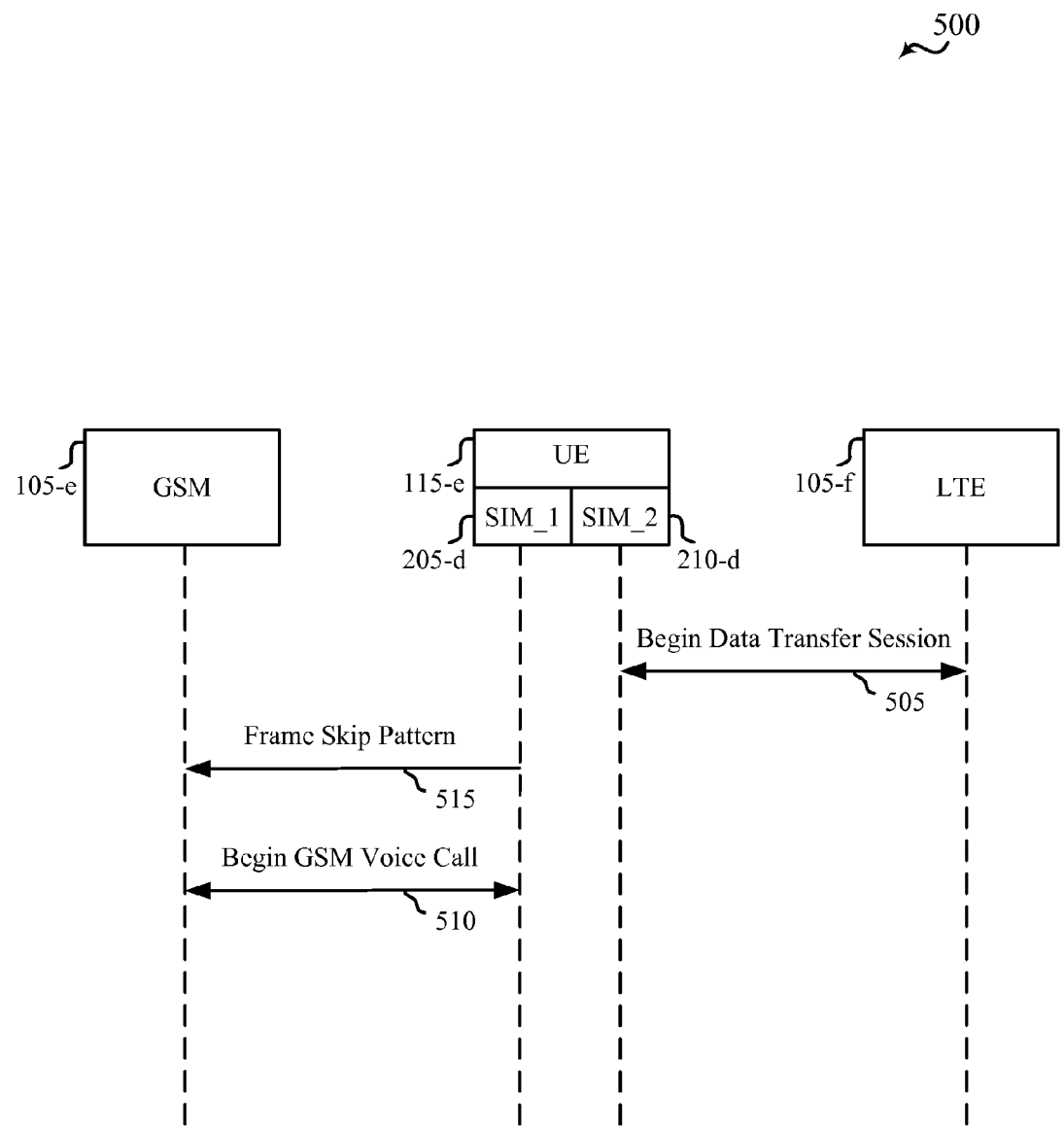
FIG. 5 shows a second exemplary message flow between a multiple SIM UE, a first network node, and a second network node, in accordance with various aspects of the present disclosure.

FIG. 5 shows a second exemplary message flow 500 between a multiple SIM UE 115-e, a first network node 105-e, and a second network node 105-f, in accordance with various aspects of the present disclosure. The UE 115-e may be an example of aspects of one of the UEs 115 described with reference to FIG. 1, 2A, 2B, 3, or 4. By way of example, the UE 115-e may have a first SIM 205-d and a second SIM 210-d. The first SIM 205-d may be associated with a first subscription for communicating over a first network via the first network node 105-e, and the second SIM 210-d may be associated with a second subscription for communicating over a second network via the second network node 105-f. By way of example, the first subscription may be a GSM voice subscription, and the second subscription may be a voice or data LTE/LTE-A, WCDMA, TD-SCDMA, 1×EV-DO, GSM, or Wi-Fi subscription (abbreviated as "LTE" with reference to the second network node 105-f shown in FIG. 5). The first and second subscriptions may be with the same or different providers.

At 505, an application of the UE 115-e may begin a data transfer session with the second network node 105-f. The application may rely on the second subscription, associated with the second SIM 210-d, to establish communication with the second network node 105-f.

At 510, the UE 115-e may initiate a GSM voice call with the first network node 105-e. The GSM voice call may rely on the first subscription associated with the first SIM 205-d. By way of example, the GSM voice call is shown to begin after the data transfer session that begins at 505. However, the GSM voice call may also begin before the data transfer session, or the GSM voice call and data transfer session may be set up in parallel. Before, during, or after setup of the GSM voice call, the UE 115-e may indicate to the first network node 105-e a frame skip pattern 515 for voice communication. The frame skip pattern 515 may be based on at least one of a receive parameter of a non-voice transmission (e.g., the data transfer session with the second network node 105-f), a transmit parameter of a non-voice transmission (e.g., the data transfer session with the second network node 105-f), or a combination thereof. The frame skip pattern may be selected to reduce transmit blanking, receive blanking, or RF impairment that may affect a non-voice transmission (e.g., the data transfer session with the second network node 105-f). In some examples, the UE 115-e may indicate an uplink frame skip pattern (e.g., a transmission blanking pattern) for GSM voice transmission and a downlink frame skip pattern (e.g., a reception blanking pattern) for GSM voice reception. In some examples, the indication(s) of the frame skip pattern(s) 515 may serve to notify the first network node 105-e that the UE 115-e has multiple SIMs.

In some examples, a frame skip pattern may indicate m frames out of n frames in which the UE 115-e may not transmit or not receive (e.g., blank) via a particular subscription (with $0 \le m < n$). For example, a frame skip pattern may take the form of [000 . . . 1 . . . 010], where the total number of logic ones is m and the total number of logic zeros is n-m. Such a frame skip pattern may help a network to not transmit or not receive in tandem with the UE 115-e. A frame skip pattern may be repeated until discontinued or replaced with another frame skip pattern. In some cases, an uplink frame skip pattern may provide more access to shared or non-impaired resources than a downlink frame skip pattern, or a downlink frame skip pattern may provide more access to shared or non-impaired resources than an uplink frame skip pattern.

Figure 6:
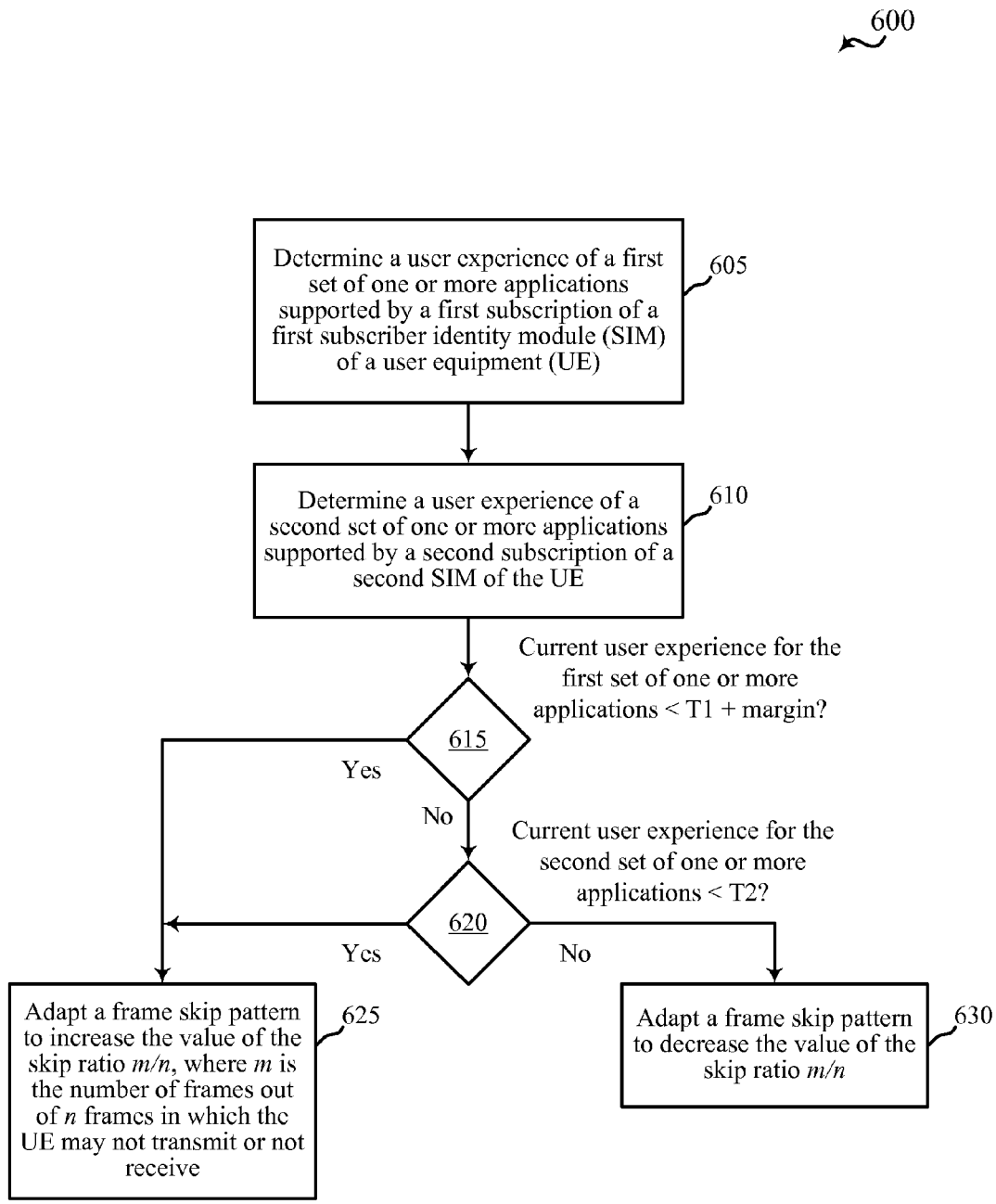
FIG. 6 is a flow chart illustrating an exemplary method for adapting a frame skip pattern, in accordance with various aspects of the present disclosure.

FIG. 6 is a flow chart illustrating an exemplary method 600 for adapting a frame skip pattern, in accordance with various aspects of the present disclosure. For clarity, the method 600 is described below with reference to aspects of one or more of the UEs 115 described with reference to FIG. 1, 2A, 2B, 3, 4, or 5. In some examples, a UE may execute one or more sets of codes to control the functional elements of the UE to perform the functions described below. Additionally or alternatively, the UE may perform one or more of the functions described below using special-purpose hardware. In some examples, the frame skip pattern generated by the method 600 may be one of the frame skip patterns described with reference to FIG. 5.

At block 605, the method 600 may include determining a user experience of a first set of one or more applications (e.g., a GSM voice call) supported by a first subscription of a first SIM of a UE. The user experience may be determined, for example, based on a condition of a channel over which the first set of one or more applications communicate with a first network node, as determined, for example, by at least one of a measured downlink channel BLER, a measured downlink channel FER, or a measured downlink channel MOS.

At block 610, the method 600 may include determining a user experience of a second set of one or more applications (e.g., a data transfer session) supported by a second subscription of a second SIM of the UE. The user experience may be determined, for example, based on a condition of a channel over which the second set of one or more applications communicate with a second network node, or a performance metric such as the QoS provided the second set of one or more applications, as determined, for example, by a measured downlink channel throughput, a measured downlink channel latency, or a measured downlink channel jitter.

In blocks 615 and 620, T1 is a user experience threshold for the first set of one or more applications, and T2 is a user experience threshold for the second set of one or more applications. In some embodiments, T1 may be a FER threshold. In some embodiments, T2 may be a relative throughput threshold (e.g., a ratio of throughput with transmission/reception constraints for multiple SIM operation to throughput without transmission/reception constraints for multiple SIM operation).

At block 615, the method 600 may include determining whether a current user experience for the first set of one or more applications (e.g., a current FER) is less than T1 plus a margin. If so, the method 600 may continue at block 625. Otherwise, the method 600 may continue at block 620.

At block 620, the method 600 may include determining whether a current user experience for the second set of one or more applications (e.g., a current throughput) is less than T2. If so, the method 600 may continue at block 625. Otherwise, the method 600 may continue at block 630.

At block 625, the method 600 may include adapting a frame skip pattern to increase the value of the skip ratio m/n, where m is the number of frames out of n frames in which the UE may not transmit or not receive (e.g., blank) via a particular subscription (with $0 \le m < n$). In some examples, the skip ratio may be increased by increasing the value of m to m+m1, where m1 is an increment value, such that $(m+m1)/n > m/n$. In some examples, the skip ratio may be increased by decreasing the value of n to n−n1, where n1 is a decrement value, such that $m/(n-n1) > m/n$. In some examples, the skip ratio may be increased by increasing the value of m to m+m1 and decreasing the value of n to n−n1, such that $(m+m1)/(n-n1) > m/n$.

At block 630, the method 600 may include adapting a frame skip pattern to decrease the value of the skip ratio m/n. In some examples, the skip ratio may be decreased by decreasing the value of m to m−m1, where m1 is a decrement value, such that $(m-m1)/n < m/n$. In some examples, the skip ratio may be decreased by increasing the value of n to n+n1, where n1 is an increment value, such that $m/(n+n1) < m/n$. In some examples, the skip ratio may be decreased by decreasing the value of m to m−m1 and increasing the value of n to n+n1, such that (m−m1)/(n+n1)<m/n.

Figure 7:
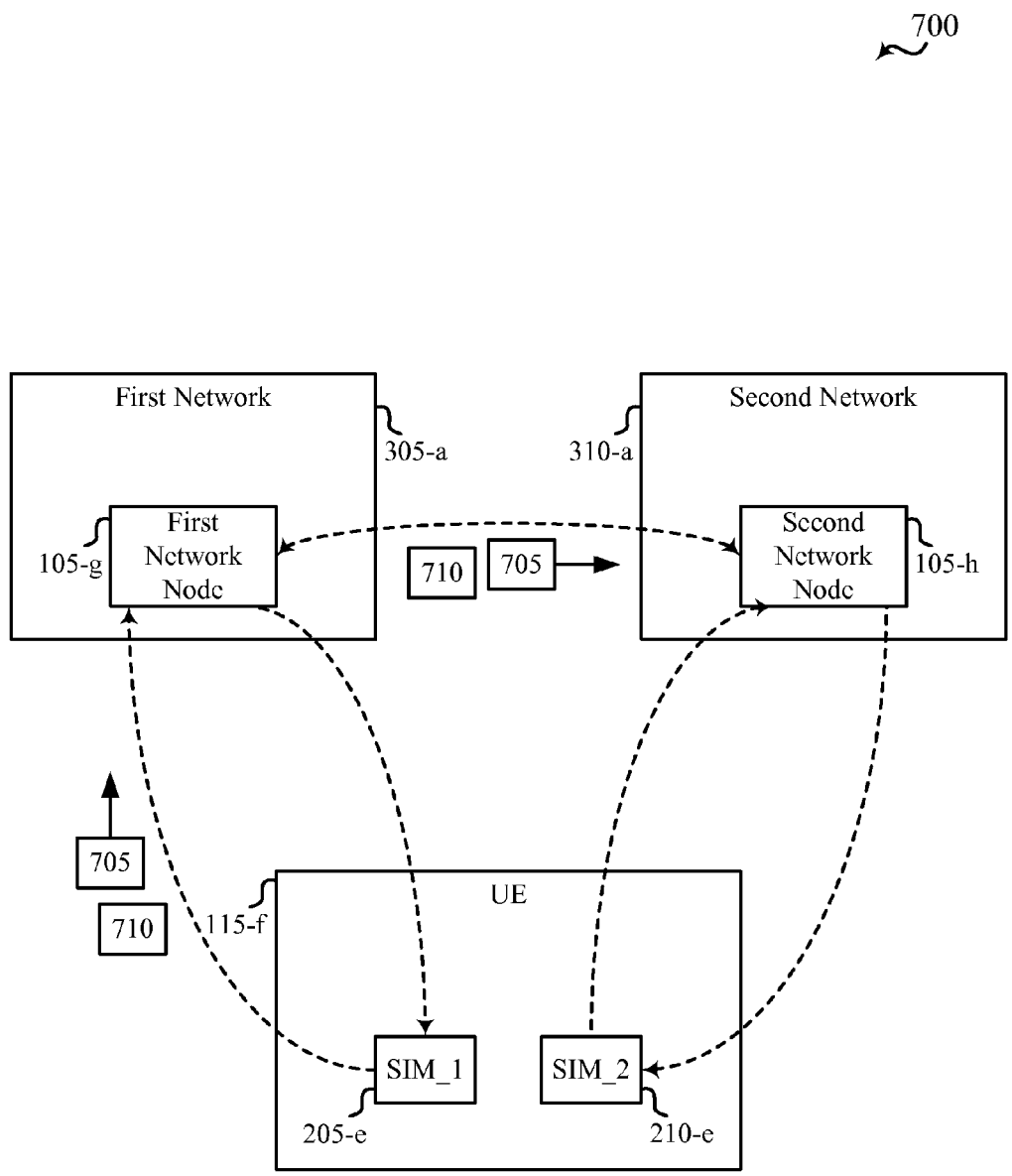
FIG. 7 shows an exemplary wireless communication system, in accordance with various aspects of the present disclosure.

FIG. 7 shows an exemplary wireless communication system 700, in accordance with various aspects of the present disclosure. The wireless communication system 700 may include a UE 115-*f* having multiple SIMs, including a first SIM 205-*e* and a second SIM 210-*e*. The UE 115-*f* may be an example of aspects of one of the UEs 115 described with reference to FIG. 1, 2A, 2B, 3, 4, 5, or 6. By way of example, the first SIM 205-*e* may be associated with a first subscription for communicating over a first network 305-*a* via a first network node 105-*g*, and the second SIM 210-*e* may be associated with a second subscription for communicating over a second network 310-*a* via a second network node 105-*h*. By way of example, the first subscription may be a GSM voice subscription, and the second subscription may be a voice or data LTE/LTE-A, WCDMA, TD-SCDMA, 1xEV-DO, GSM, or Wi-Fi subscription. The first and second subscriptions may be with the same or different providers.

In some embodiments, the UE 115-*f*, the first network node 105-*g*, and the second network node 105-*h* may perform one or more of the functions described with reference to the UE 115-*c*, the first network node 105-*a*, and the second network node 105-*b* described with reference to FIG. 3. To enable better coordination between the first and second network nodes 105-*g*, 105-*h*, the UE 115-*f* may provide its network-specific identifiers to one or both of the first network node 105-*g* and the second network node 105-*h*. For example, when notifying the first network node 105-*g* of the multiple SIM capability of the UE 115-*f*, the UE 115-*f* may provide the first network node 105-*g* with both its network-specific identifier (ID 705) for the first network 305-*a* and its network-specific identifier (ID 710) for the second network 310-*a*. The first network node 105-*g* may then transmit one or more UE-specific coordination messages including the UE's network-specific identifier 710 for the second network 310-*a*, or the UE's network-specific identifier 705 for the first network 305-*a* and the UE's network-specific identifier 710 for the second network 310-*a*, to the second network 310-*a*. In some cases, the UE-specific coordination message(s) may be transmitted directly from the first network node 105-*g* to the second network node 105-*h*. In other cases, the UE-specific coordination message(s) may be transmitted from the first network node 105-*g* to the second network node 105-*h* indirectly (e.g., via an intermediary node such as the UE 115-*f* or an authentication server).

Although UE-specific coordination messages may provide the best optimization for the UE's multiple SIMs 205-*e*, 210-*e*, the generation and transmission of UE-specific coordination messages for multiple UEs can cause the first or second network node 105-*g*. 105-*h* to incur a lot of signaling overhead. In addition, the mapping of a UE's network-specific identifiers 705, 710 can be non-trivial (e.g., due to security issues). It may therefore be useful to aggregate UE information, and to exchange aggregate UE information instead of UE-specific context information, as described below with reference to FIG. 8.

Figure 8:
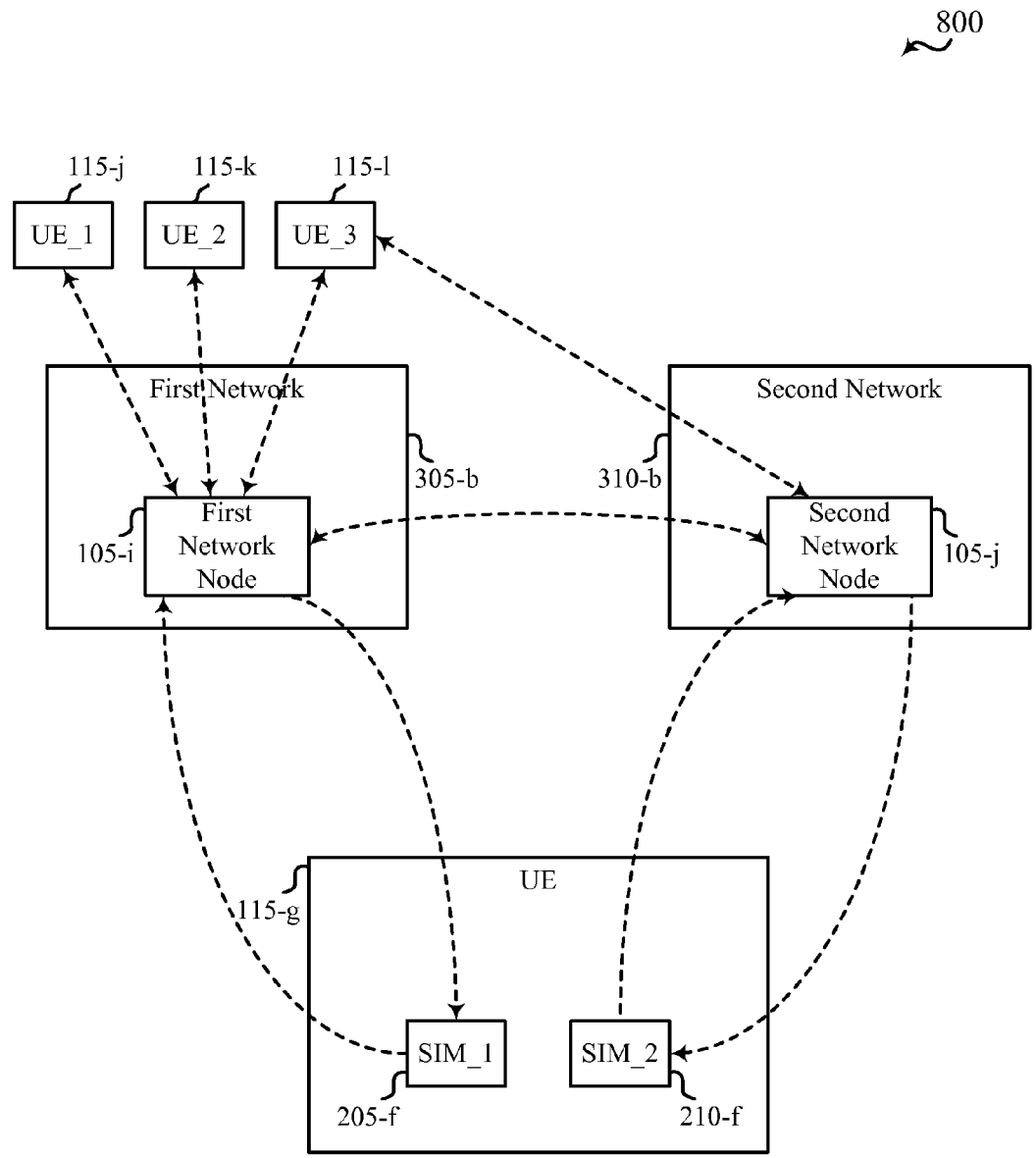
FIG. 8 shows an exemplary wireless communication system, in accordance with various aspects of the present disclosure.

FIG. 8 shows an exemplary wireless communication system 800, in accordance with various aspects of the present disclosure. The wireless communication system 800 may include a UE 115-*g* having multiple SIMs, including a first SIM 205-*f* and a second SIM 210-*f*. The UE 115-*g* may be an example of aspects of one of the UEs 115 described with reference to FIG. 1, 2A, 2B, 3, 4, 5, 6, or 7. By way of example, the first SIM 205-*f* may be associated with a first subscription for communicating over a first network 305-*b* via a first network node 105-*i*, and the second SIM may be associated with a second subscription for communicating over a second network 310-*b* via a second network node 105-*j*. By way of example, the first subscription may be a GSM voice subscription, and the second subscription may be a voice or data LTE/LTE-A, WCDMA, TD-SCDMA, 1xEV-DO, GSM, or Wi-Fi subscription. The first and second subscriptions may be with the same or different providers.

In some embodiments, the UE 115-*g*, the first network node 105-*i*, and the second network node 105-*j* may perform one or more of the functions described with reference to the UE 115-*c*, the first network node 105-*a*, and the second network node 105-*b* described with reference to FIG. 3. To reduce the overhead of multiple SIM UE coordination between the first and second network nodes 105-*i*, 105-*j*, the first and second network nodes 105-*i*, 105-*j* may not exchange UE-specific context information, but instead exchange aggregate UE information. For example, the first network node 105-*i* may aggregate UE information for a plurality of UEs 115-*j*, 115-*k*, 115-*l* (e.g., a plurality of UEs including a number of multiple SIM UEs) that communicate with the first network node 105-*i*. By way of example, some of the UEs (e.g., UE 115-*l*) may communicate with the first network 305-*b* and/or the second network 310-*b*. Some of the UEs may also or alternatively communicate with a third network (not shown). The third network may be a non-cooperating network with respect to the first and second networks 305-*b*, 310-*b*, and thus, the first and second networks 305-*b*, 310-*b*, may not exchange aggregate UE information with the third network.

Given the scenario described with reference to FIG. 8, and by way of example, the first network node 105-*i* (or first network 305-*b*) may aggregate UE information for four common UE contexts (e.g., four UE context types: U1, U2, U3, and U4). Each common UE context may be associated with a corresponding set of common resource demands (e.g., resource demand(s) R1, R2, R3, or R4). A first set of one or more resource demands (R1) may present coexistence issues with the second network 310-*b* and the third network. A second set of one or more resource demands (R2) may present a coexistence issue with the second network 310-*b* but not the third network. A third set of one or more resource demands (R3) may present a coexistence issue with the third network but not the second network 310-*b*. A fourth set of one or more resource demands (R4) may not present a coexistence issue with the second network 310-*b* or the third network. The aggregate UE context information for UE types U1, U2, U3, and U4 is summarized in Table 1.

TABLE 1

| UE Context Type | Resource Demand(s) | Second Network Constraint | Third Network Constraint |
|---|---|---|---|
| U1 | R1 | Coexistence issue with second network | Coexistence issue with third network |
| U2 | R2 | Coexistence issue with second network | No coexistence issue with third network |
| U3 | R3 | No coexistence issue with second network | Coexistence issue with third network |
| U4 | R4 | No coexistence issue with second network | No coexistence issue with third network |

Upon receiving aggregate UE information from another network or network node, or from multiple networks or network nodes, the aggregate UE information may be used to schedule a data transmission for the UE 115-*g* and/or other UEs (e.g., UEs 115-*j*, 115-*k*, and 115-*l*). Although the scheduling for the UE 115-*g* may or may not provide the best optimization for the UE's multiple SIMs 205-*f*, 210-*f*, the scheduling may be better than a scheduling made in the absence of network coordination between networks and network nodes.

In another example of exchanging aggregate UE information, consider a plurality of UEs having multiple SIM capabilities, communicating with synchronized cooperating networks via their multiple SIMs. Each of the UEs may have a number of transmission and/or reception constraints per SIM. In such a scenario, a network node in communication with some or all of the UEs may define, for each network resource (e.g., each time, frequency, space, code, or other resource), an aggregate of UEs that share the same transmission and/or reception constraints. In response, groups of UEs sharing all of the same resources and constraints may be defined (i.e., more granular groups), or groups of UEs that are similarly constrained (e.g., UE Group I—unconstrained; UE Group II—moderately constrained; and UE Group III—heavily constrained) may be defined (i.e., less granular groups).

When exchanging aggregate UE information, it may be useful to exchange information for larger time windows (e.g., for more TTIs, or for more than a slot or a frame).

In any of the examples described with reference to FIG. 3, 4, 5, 6, 7, or 8, a network or network node may modify the scheduling of control information transmitted to a UE, as well as the scheduling of data transmissions and receptions. The scheduling of both control information and data transmission/reception operations may be undertaken based on a notification from the UE that the UE is a multiple SIM UE. The scheduling of control information may in some cases be used to enhance data transmission/reception operations for a multiple SIM UE. In some examples, a network and/or UE may determine a target signaling loss rate for the UE when the UE is operating in a multiple SIM mode (i.e., a mode in which more than one SIM of the UE is being actively used). The target signaling loss rate may be different from the signaling loss rate of the UE when the UE is operating in a single SIM mode. Alternately, the network and/or UE may determine that the target signaling loss rate for the UE when the UE is operating in a multiple SIM mode should be the same as the target signaling loss rate of the UE when the UE is operating in a single SIM mode. In the latter case, the network may modify the timeline or contents of the UE's downlink or uplink control channels to assist the UE in meeting the target signaling loss rate.

Figure 9:
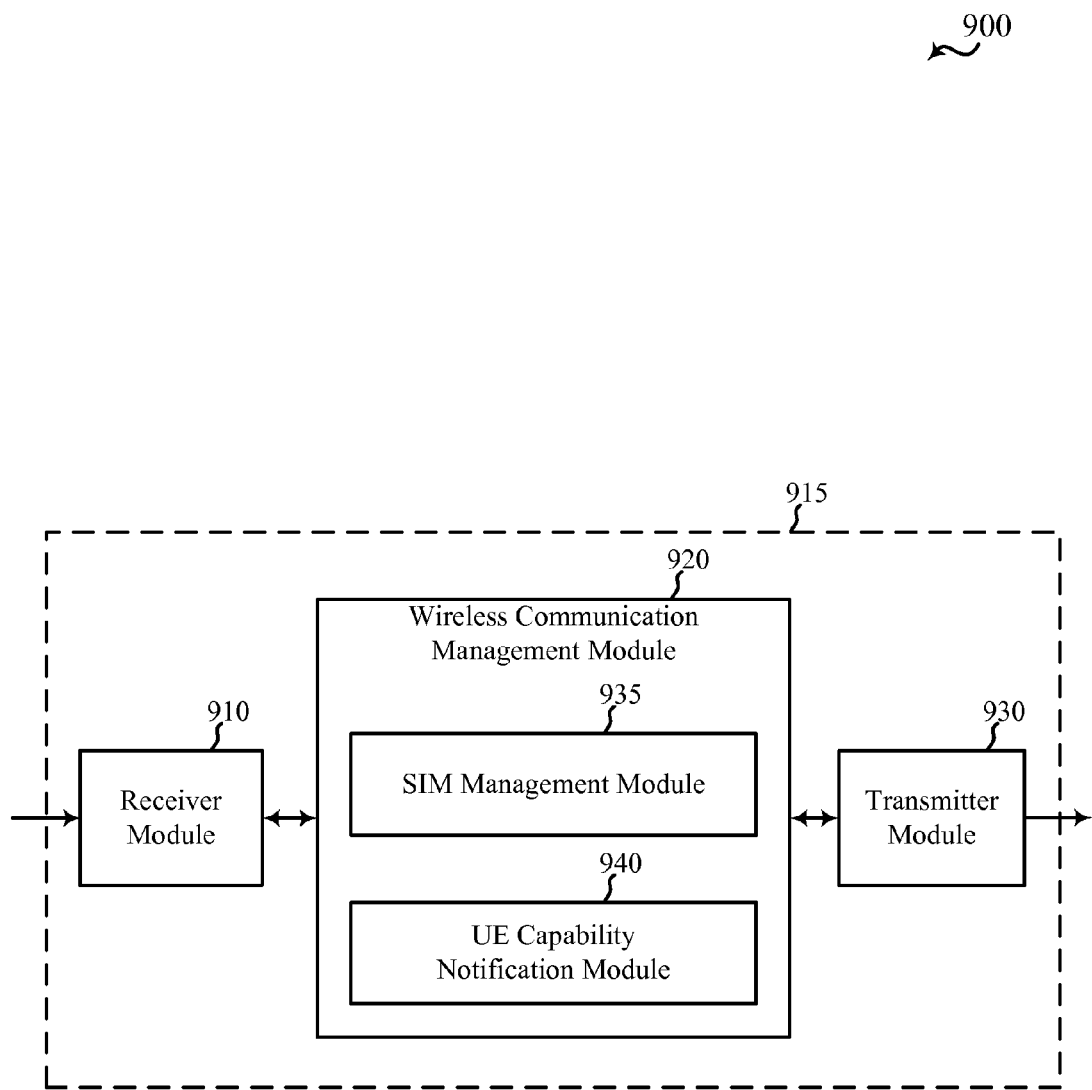
FIG. 9 shows a block diagram of a device for use in wireless communication, in accordance with various aspects of the present disclosure.

FIG. 9 shows a block diagram 900 of a device 915 for use in wireless communication, in accordance with various aspects of the present disclosure. The device 915 may be an example of aspects of one or more of the UEs 115 described with reference to FIG. 1, 2A, 2B, 3, 4, 5, 6, 7, or 8. The device 915 may also be or include a processor. The device 915 may include a receiver module 910, a wireless communication management module 920, or a transmitter module 930. Each of these modules may be in communication with each other.

The modules of the device 915 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 may include at least one RF receiver operable to receive transmissions over at least one radio frequency spectrum. In some examples, the at least one radio frequency spectrum may be used for GSM, LTE/LTE-A, WCDMA, TD-SCDMA, 1×EV-DO, or Wi-Fi communications, as described, for example, with reference to FIG. 1, 2A, 2B, 3, 4, 5, 6, 7, or 8. The receiver module 910 may be used to receive various types of data or control signals (i.e., transmissions) over one or more communication links of a wireless communication system, such as one or more communication links of the wireless communication system 100, 300, 700, or 800 described with reference to FIG. 1, 3, 7, or 8.

In some examples, the transmitter module 930 may include at least one RF transmitter operable to transmit over the at least one radio frequency spectrum. The transmitter module 930 may be used to transmit various types of data or control signals (i.e., transmissions) over one or more communication links of a wireless communication system, such as one or more communication links of the wireless communication system 100, 300, 700, or 800 described with reference to FIG. 1, 3, 7, or 8.

In some examples, the wireless communication management module 920 may be used to manage one or more aspects of wireless communication for a multiple SIM UE including the device 915. In some examples, the wireless communication management module 920 may include a SIM management module 935 or a UE capability notification module 940.

In some examples, the SIM management module 935 may be used to determine a capability of the UE including the device 915 to support multiple SIMs. The multiple SIMs may enable the UE to communicate with multiple network nodes (e.g., multiple base stations). In some examples, a first SIM of the UE may enable the UE to communicate with a first network node associated with a first provider (e.g., a first public land mobile network (PLMN) or mobile network operator (MNO)), and a second SIM of the UE may enable the UE to communicate with a second network node associated with a second provider.

In some examples, the UE capability notification module 940 may be used to notify at least one network node of the multiple network nodes of the multiple SIM capability of the UE.

Figure 10:
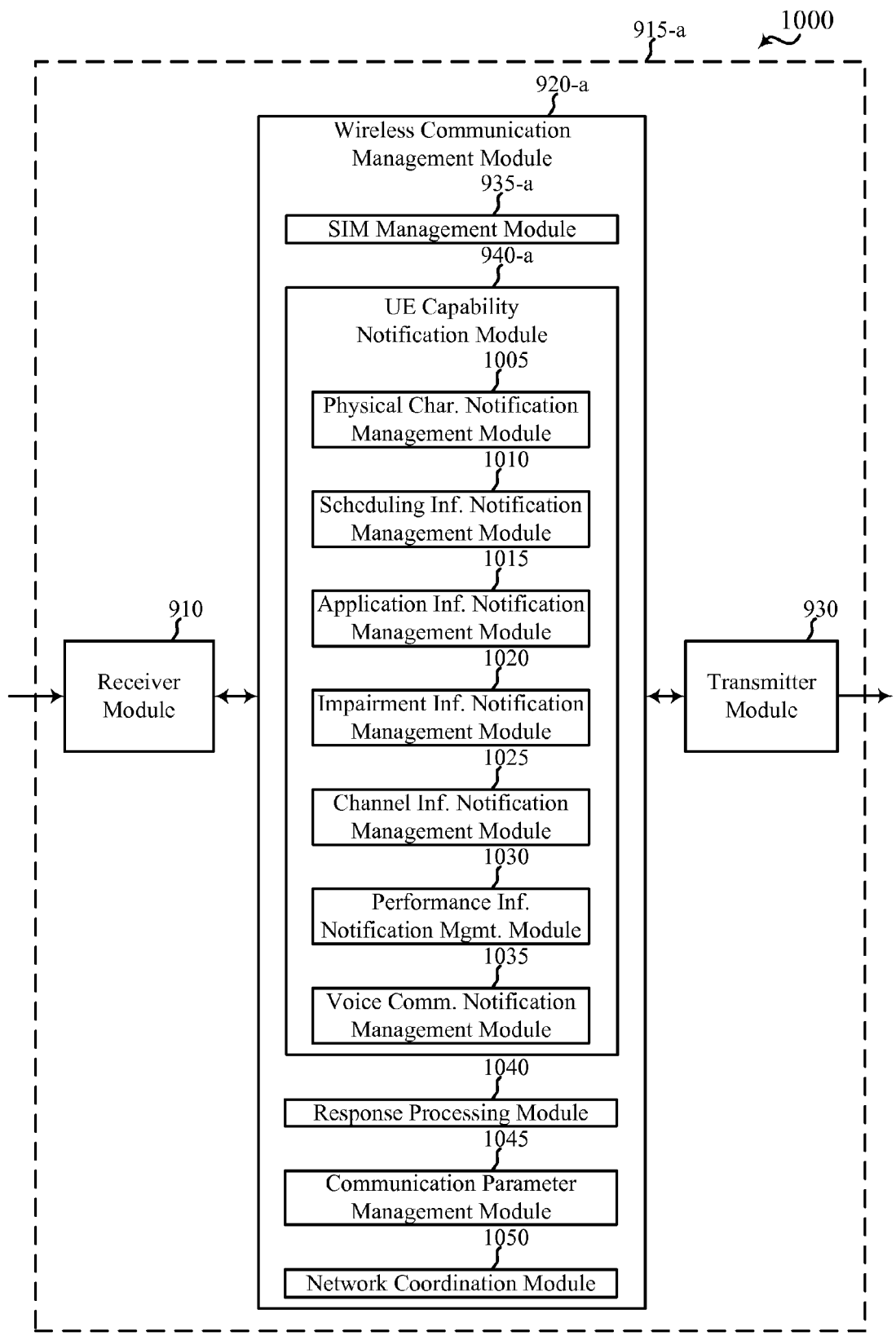
FIG. 10 shows a block diagram of a device for use in wireless communication, in accordance with various aspects of the present disclosure.

FIG. 10 shows a block diagram 1000 of a device 915-*a* for use in wireless communication, in accordance with various aspects of the present disclosure. The device 915-*a* may be an example of aspects of one or more of the UEs 115 described with reference to FIG. 1, 2A, 2B, 3, 4, 5, 6, 7, or 8, or aspects of the device 915 described with reference to FIG. 9. The device 915-*a* may also be or include a processor. The device 915-*a* may include a receiver module 910, a wireless communication management module 920-*a*, or a transmitter module 930. Each of these modules may be in communication with each other.

The modules of the device 915-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 and transmitter module 930 may be configured as described with reference to FIG. 9. In some examples, the wireless communication management module 920-*a* may be used to manage one or more aspects of wireless communication for a multiple SIM UE including the device 915-*a*. In some examples, the wireless communication management module 920-*a* may include a SIM management module 935-*a*, a UE capability notification module 940-*a*, a response processing module 1040, a communication parameter management module 1045, or a network coordination module 1050.

In some examples, the SIM management module 935-*a* may be used to determine a capability of the UE including the device 915-*a* to support multiple SIMs. The multiple SIMs may enable the UE to communicate with multiple network nodes (e.g., multiple base stations). In some examples, a first SIM of the UE may enable the UE to communicate with a first network node associated with a first provider (e.g., a first PLMN or MNO), and a second SIM of the UE may enable the UE to communicate with a second network node associated with a second provider.

In some examples, the UE capability notification module 940-*a* may be used to notify at least one network node of the multiple network nodes of the multiple SIM capability of the UE. In some configurations, the UE capability notification module 940-*a* may include at least one of a physical characteristic notification management module 1005, a scheduling information notification management module 1010, an application information notification management module 1015, an impairment information notification management module 1020, a channel information notification management module 1025, a performance information notification management module 1030, or a voice communication notification management module 1035.

In some cases, the physical characteristic notification management module 1005 may be used by the UE capability notification module 940-*a* to send an indication of a physical characteristic of the UE associated with the multiple SIMs. The physical characteristic may include, for example, at least one of a number of SIMs in the UE, a number of transmit chains available in the UE, a number of receive chains available in the UE, a number of transmit chains available per SIM in the UE, a number of receive chains available per SIM in the UE, an indication of transmit chain sharing, an indication of receive chain sharing, or a combination thereof.

In some cases, the scheduling information notification management module 1010 may be used by the UE capability notification module 940-*a* to send scheduling information associated with the multiple SIMs. The scheduling information may include at least one of uplink scheduling information, downlink scheduling information, power savings scheduling information, or a combination thereof.

In some cases, the application information notification management module 1015 may be used by the UE capability notification module 940-*a* to send application information associated with the multiple SIMs. The application information may include at least one of applications supported per SIM in the UE, application priority information, an application layer buffer status, an application QoS, or a combination thereof.

In some cases, the impairment information notification management module 1020 may be used by the UE capability notification module 940-*a* to send impairment information associated with the multiple SIMs. The impairment information may include at least one of a transmit blanking schedule, a receive blanking schedule, or a combination thereof.

In some cases, the channel information notification management module 1025 may be used by the UE capability notification module 940-*a* to send channel information associated with the multiple SIMs. The channel information may include at least one of a channel estimation, a pathloss, or a combination thereof.

In some cases, the performance information notification management module 1030 may be used by the UE capability notification module 940-*a* to send performance information associated with the multiple SIMs. The performance information may include at least one of a transmit performance metric, a target transmit blanking rate, a target uplink channel FER, a receive performance metric, a measured downlink channel BLER, a measured downlink channel FER, a measured downlink channel MOS, a measured downlink channel throughput, a measured downlink channel latency, a measured downlink channel jitter, a semi-static performance metric, a dynamic performance metric, an application-specific performance metric, or a combination thereof.

In some cases, the voice communication notification management module 1035 may be used by the UE capability notification module 940-*a* to indicate a preferred slot for voice communication. The preferred slot may be based on at least one of a receive parameter of a non-voice transmission, a transmit parameter of a non-voice transmission, or a combination thereof. In other cases, the voice communication notification management module 1035 may be used to indicate a frame skip pattern for voice applications of the UE. In some embodiments, the voice communication notification management module 1035 may adapt the frame skip pattern based on channel conditions and performance metrics of the multiple network nodes.

The response processing module 1040 may be used to receive a response from the at least one network node based on the notification. In some cases, the response may include an uplink channel performance metric.

The communication parameter management module 1045 may be used to modify a communication parameter of the UE based on the response. In some examples, the communication parameter may include at least one of a downlink scheduling parameter, an uplink scheduling parameter, a timer, a transmit blanking parameter, a receive blanking parameter, an application prioritization parameter, an RRC state, an MCS-related parameter (e.g., an ETFCI), a paging occasion, or a combination thereof. In some examples, the communication parameter may include a slot to be used for voice communication. The slot may be based on at least one of a receive parameter of a non-voice transmission, a transmit parameter of a non-voice transmission, or a combination thereof. In some examples, the communication parameter may include a frame skip pattern for voice applications of the UE. In the latter case, the communication parameter management module 1045 may be used to adapt the frame skip pattern based on channel conditions and performance metrics of the multiple network nodes.

The network coordination module 1050 may be used to receive a coordination message from the at least one network node. The coordination message may be based on the notification. In some embodiments, the at least one network node may be associated with a first provider, and the at least one other network node may be associated with a second provider. The network coordination module 1050 may also be used to forward the coordination message to at least one other network node of the multiple network nodes. The coordination message may be utilized by the at least one other network node to coordinate communications with the UE and the at least one network node.

Figure 11:
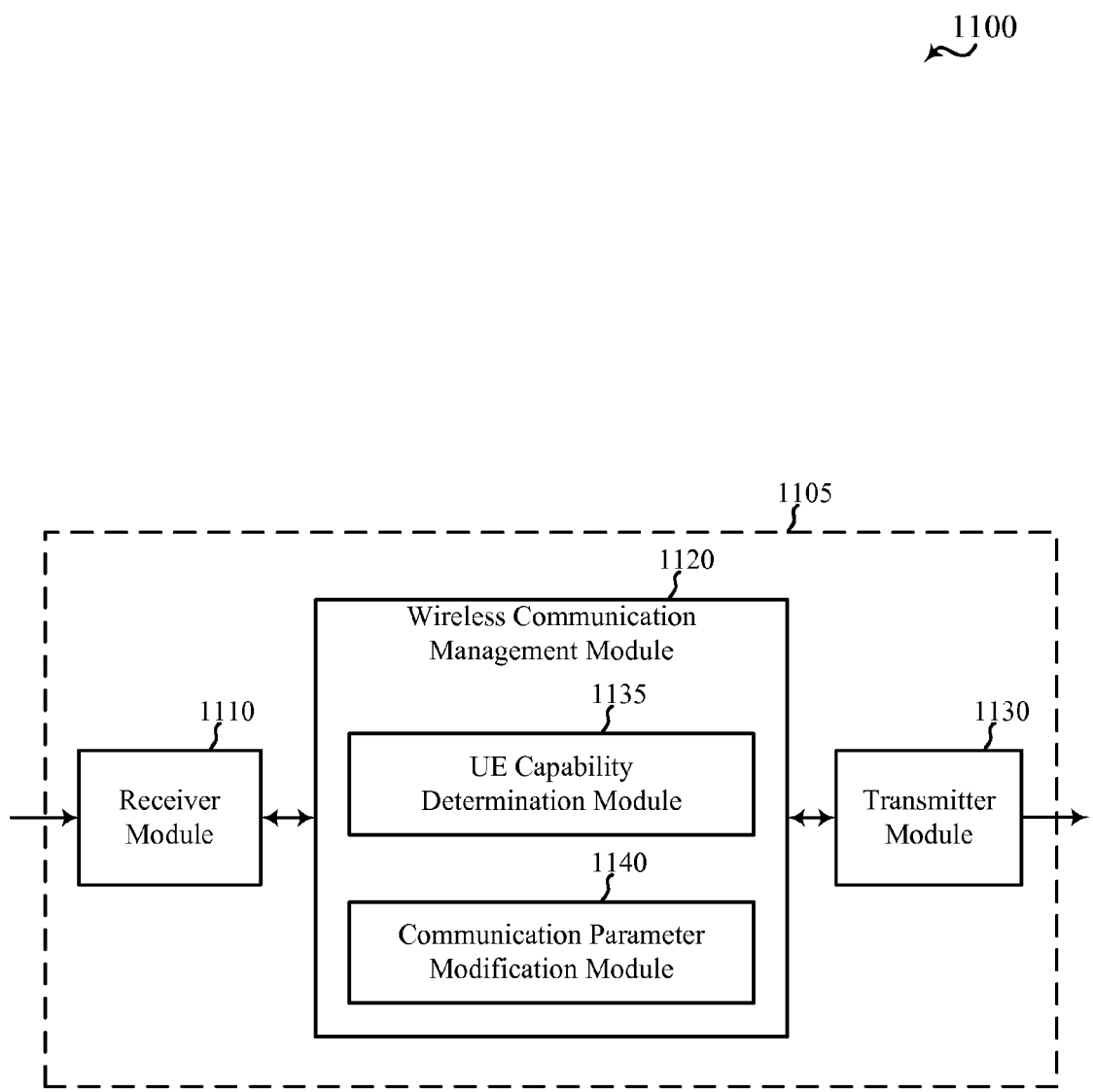
FIG. 11 shows a block diagram of a device for use in wireless communication, in accordance with various aspects of the present disclosure.

FIG. 11 shows a block diagram 1100 of a device 1105 for use in wireless communication, in accordance with various aspects of the present disclosure. The device 1105 may be an example of aspects of one or more of the base stations or network nodes 105 described with reference to FIG. 1, 2A, 2B, 3, 4, 5, 6, 7, or 8. The device 1105 may also be or include a processor. The device 1105 may include a receiver module 1110, a wireless communication management module 1120, or a transmitter module 1130. Each of these modules may be in communication with each other.

The modules of the device 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include at least one RF receiver operable to receive transmissions over at least one radio frequency spectrum. In some examples, the at least one radio frequency spectrum may be used for GSM, LTE/LTE-A, WCDMA, TD-SCDMA, 1×EV-DO, or Wi-Fi communications, as described, for example, with reference to FIG. 1, 2A, 2B, 3, 4, 5, 6, 7, or 8. The receiver module 1110 may be used to receive various types of data or control signals (i.e., transmissions) over one or more communication links of a wireless communication system, such as one or more communication links of the wireless communication system 100, 300, 700, or 800 described with reference to FIG. 1, 3, 7, or 8.

In some examples, the transmitter module 1130 may include at least one RF transmitter operable to transmit over the at least one radio frequency spectrum. The transmitter module 1130 may be used to transmit various types of data or control signals (i.e., transmissions) over one or more communication links of a wireless communication system, such as one or more communication links of the wireless communication system 100, 300, 700, or 800 described with reference to FIG. 1, 3, 7, or 8.

In some examples, the wireless communication management module 1120 may be used to manage one or more aspects of wireless communication for a network node or base station including the device 1105. In some examples, the wireless communication management module 1120 may include a UE capability determination module 1135 or a communication parameter modification module 1140.

In some examples, the UE capability determination module 1135 may be used to receive, at a first network node, a notification of a capability of a UE to support multiple SIMs. The multiple SIMs may enable the UE to communicate with multiple network nodes (e.g., multiple base stations). In some examples, a first SIM of the UE may enable the UE to communicate with the first network node, and a second SIM of the UE may enable the UE to communicate with a second network node. In some cases, the first network node may be associated with a first provider (e.g., a first PLMN or MNO), and the second network node may be associated with a second provider.

In some examples, the communication parameter modification module 1140 may be used to modify a communication parameter of the first network node based on the notification. In some examples, the communication parameter may include at least one of a downlink scheduling parameter, an uplink scheduling parameter, an application prioritization parameter, a performance metric, a radio access technology used by the UE, or a combination thereof. In some examples, modifying the communication parameter may include selecting a radio access technology for at least one of the SIMs, and notifying the UE of the selection.

In some embodiments of the device 1105, the first network node may be associated with a first network, and the wireless communication management module 1120 may receive from the UE an identifier of at least a second network. The UE may be in communication with the second network via the second SIM. In some cases, the device 1105 may communicate with the second network directly or via the UE.

Figure 12:
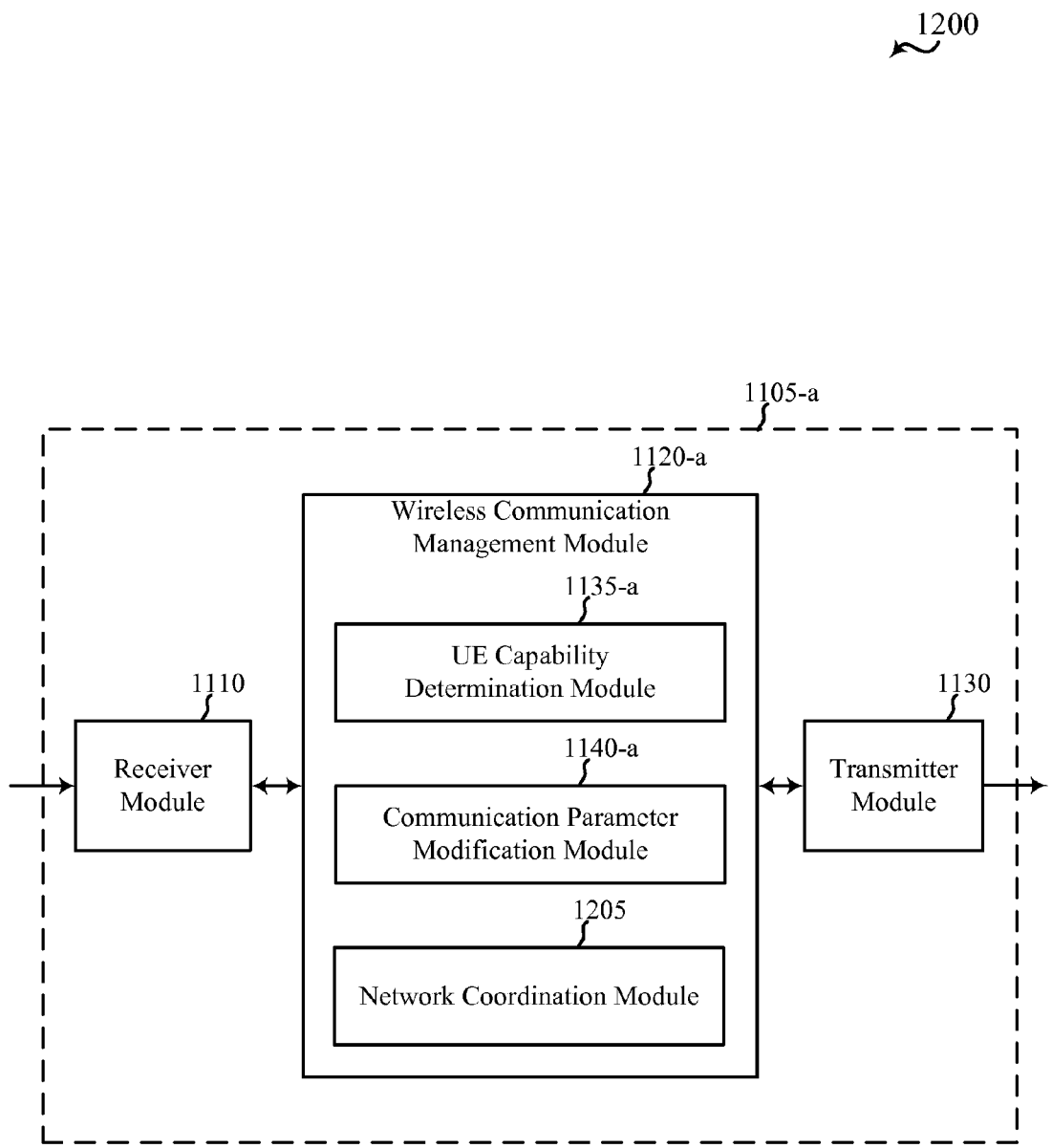
FIG. 12 shows a block diagram of a device for use in wireless communication, in accordance with various aspects of the present disclosure.

FIG. 12 shows a block diagram 1200 of a device 1105-*a* for use in wireless communication, in accordance with various aspects of the present disclosure. The device 1105-*a* may be an example of aspects of one or more of the base stations or network nodes 105 described with reference to FIG. 1, 2A, 2B, 3, 4, 5, 6, 7, or 8, or aspects of the device 1105 described with reference to FIG. 11. The device 1105-*a* may also be or include a processor. The device 1105-*a* may include a receiver module 1110, a wireless communication management module 1120-*a*, or a transmitter module 1130. Each of these modules may be in communication with each other.

The modules of the device 1105-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 and transmitter module 1130 may be configured as described with reference to FIG. 11. In some examples, the wireless communication management module 1120-*a* may be used to manage one or more aspects of wireless communication for a network node or base station including the device 1105-*a*. In some examples, the wireless communication management module 1120-*a* may include a UE capability determination module 1135-*a*, a communication parameter modification module 1140-*a*, or a network coordination module 1205.

In some examples, the UE capability determination module 1135-*a* may be used to receive, at a first network node, a notification of a capability of a UE to support multiple SIMs. The multiple SIMs may enable the UE to communicate with multiple network nodes (e.g., multiple base stations). In some examples, a first SIM of the UE may enable the UE to communicate with the first network node, and a second SIM of the UE may enable the UE to communicate with a second network node. In some cases, the first network node may be associated with a first provider (e.g., a first PLMN or MNO), and the second network node may be associated with a second provider.

In some examples, the communication parameter modification module 1140-*a* may be used to modify a communication parameter of the first network node based on the notification. In some examples, the communication parameter may include at least one of a downlink scheduling parameter, an uplink scheduling parameter, an application prioritization parameter, a performance metric, a radio access technology used by the UE, or a combination thereof. In some examples, modifying the communication parameter may include selecting a radio access technology for at least one of the SIMs, and notifying the UE of the selection.

In some examples, the network coordination module 1205 may be used to transmit a coordination message. More particularly, and in some embodiments, the network coordination module 1205 may be used to transmit a coordination message to an intermediary node. The coordination message may be based on the notification of the capability of the UE to support multiple SIMs. The intermediary node may forward the coordination message to a second network node. In some examples, the intermediary node may include at least one of the UE or an authentication server, and in some examples, the first network node and the second network node may be associated with different providers (e.g., a first provider and a second provider, respectively). Also or alternatively, and in some embodiments, the network coordination module 1205 may be used to transmit a coordination message to a second network node. The coordination message may be based on the notification of the capability of the UE to support multiple SIMs, and may be used by the second network node to coordinate communications with the UE and/or the first network node. In some examples, the first network node and the second network node may be associated with a same provider.

In some embodiments of the device 1105-*a*, the may first network node may be associated with a first network, and the wireless communication management module 1120-*a* may receive from the UE an identifier of at least a second network. The UE may be in communication with the second network via the second SIM. In some cases, the first network node may communicate with the second network directly or via the UE.

Figure 13:
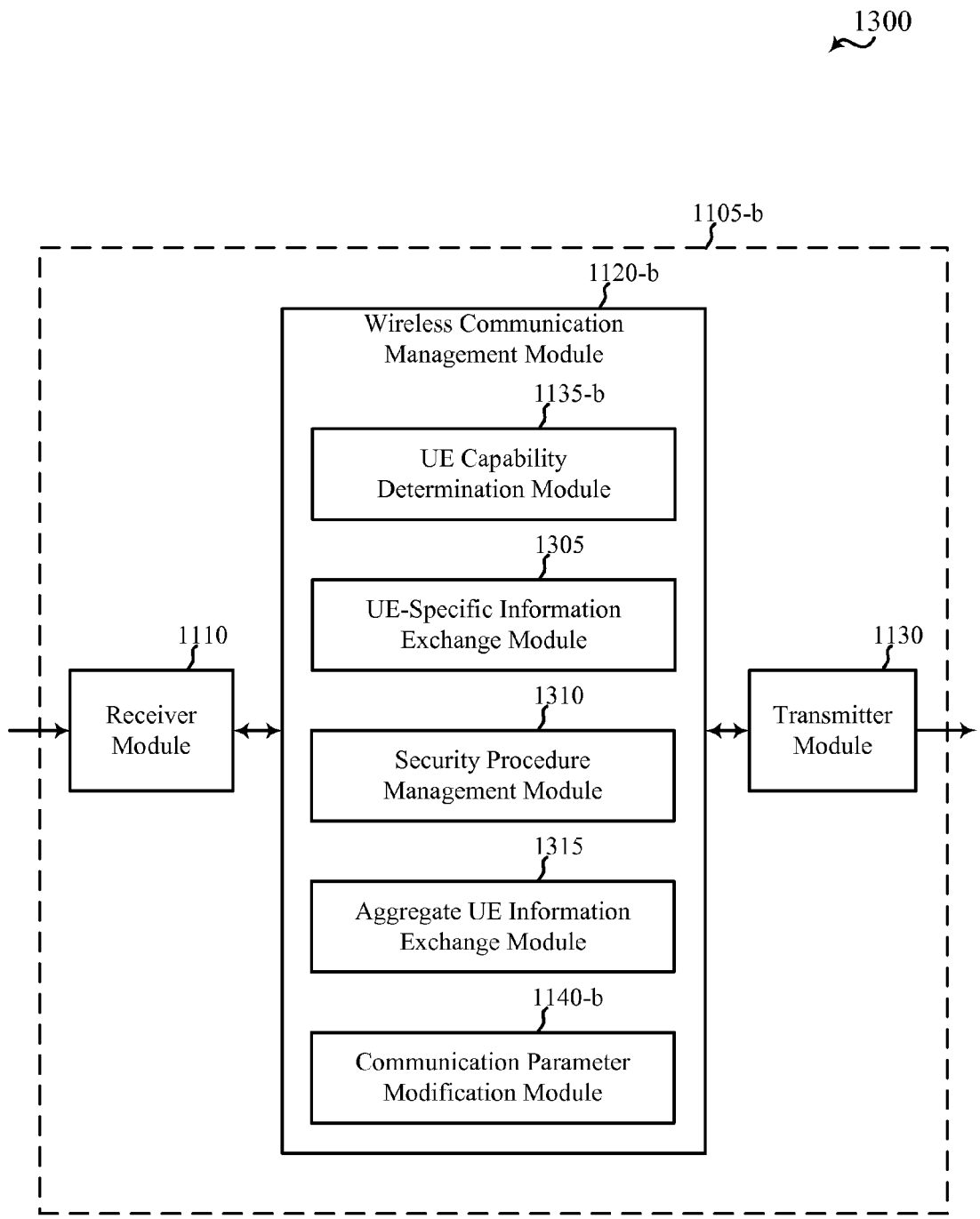
FIG. 13 shows a block diagram of a device for use in wireless communication, in accordance with various aspects of the present disclosure.

FIG. 13 shows a block diagram 1300 of a device 1105-*b* for use in wireless communication, in accordance with various aspects of the present disclosure. The device 1105-*b* may be an example of aspects of one or more of the base stations or network nodes 105 described with reference to FIG. 1, 2A, 2B, 3, 4, 5, 6, 7, or 8, or aspects of the device 1105 described with reference to FIG. 11 or 12. The device 1105-*b* may also be or include a processor. The device 1105-*b* may include a receiver module 1110, a wireless communication management module 1120-*b*, or a transmitter module 1130. Each of these modules may be in communication with each other.

The modules of the device 1105-*b* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 and transmitter module 1130 may be configured as described with reference to FIG. 11. In some examples, the wireless communication management module 1120-*b* may be used to manage one or more aspects of wireless communication for a network node or base station including the device 1105-*b*. In some examples, the wireless communication management module 1120-*b* may include a UE capability determination module 1135-*b*, a UE-specific information exchange module 1305, a security procedure management module 1310, an aggregate UE information exchange module 1315, or a communication parameter modification module 1140-*b*.

In some examples, the UE capability determination module 1135-*b* may be used to receive, at a first network node, a notification of a capability of a UE to support multiple SIMs. The multiple SIMs may enable the UE to communicate with multiple network nodes (e.g., multiple base stations). In some examples, a first SIM of the UE may enable the UE to communicate with the first network node, and a second SIM of the UE may enable the UE to communicate with a second network node. In some cases, the first network node may be associated with a first provider (e.g., a first PLMN or MNO), and the second network node may be associated with a second provider.

In some examples, the UE-specific information exchange module 1305 may be used to exchange with a second network node at least one of UE scheduling information or UE configuration information. In some examples, the exchanging may include receiving UE scheduling information from the second network node.

In some embodiments of the device 1105-*b*, the first network node may be associated with a first network and the second network node may be associated with a second network. In these embodiments, the UE scheduling information may include information compiled over more than one frame. In other embodiments, the first and second network nodes may be associated with the same network. In these latter embodiments, the UE scheduling information may include information compiled over one of a single frame or a partial frame.

In some examples, the security procedure management module 1310 may be used to trigger a UE-assisted security procedure before the UE-specific information exchange module 1305 exchanges the UE scheduling information or UE configuration information with the second node.

In some examples, the aggregate UE information exchange module 1315 may be used to exchange aggregate UE information with a second network node. In some embodiments, the first network node may be associated with a first network and the second network node may be associated with a second network. In some cases, the exchanging may include receiving, at the first network node, aggregate UE information from (e.g., compiled by) the second network node. By way of example, the aggregate UE information may be based on a common UE context and/or common sets of UE resource demands.

In some examples, the communication parameter modification module 1140-*b* may be used to modify a communication parameter of the first network node based on the notification of the capability of the UE to support multiple SIMs, the UE scheduling information received using the UE-specific information exchange module 1305, and/or the aggregate UE information received using the aggregate UE information exchange module 1315. In some examples, the communication parameter may include at least one of a downlink scheduling parameter, an uplink scheduling parameter, an application prioritization parameter, a performance metric, a radio access technology used by the UE, or a combination thereof. In some examples, modifying the communication parameter may include selecting a radio access technology for at least one of the SIMs, and notifying the UE of the selection. In some examples, modifying the communication parameter may include scheduling a data transmission for the UE based on the aggregate UE information.

Figure 14:
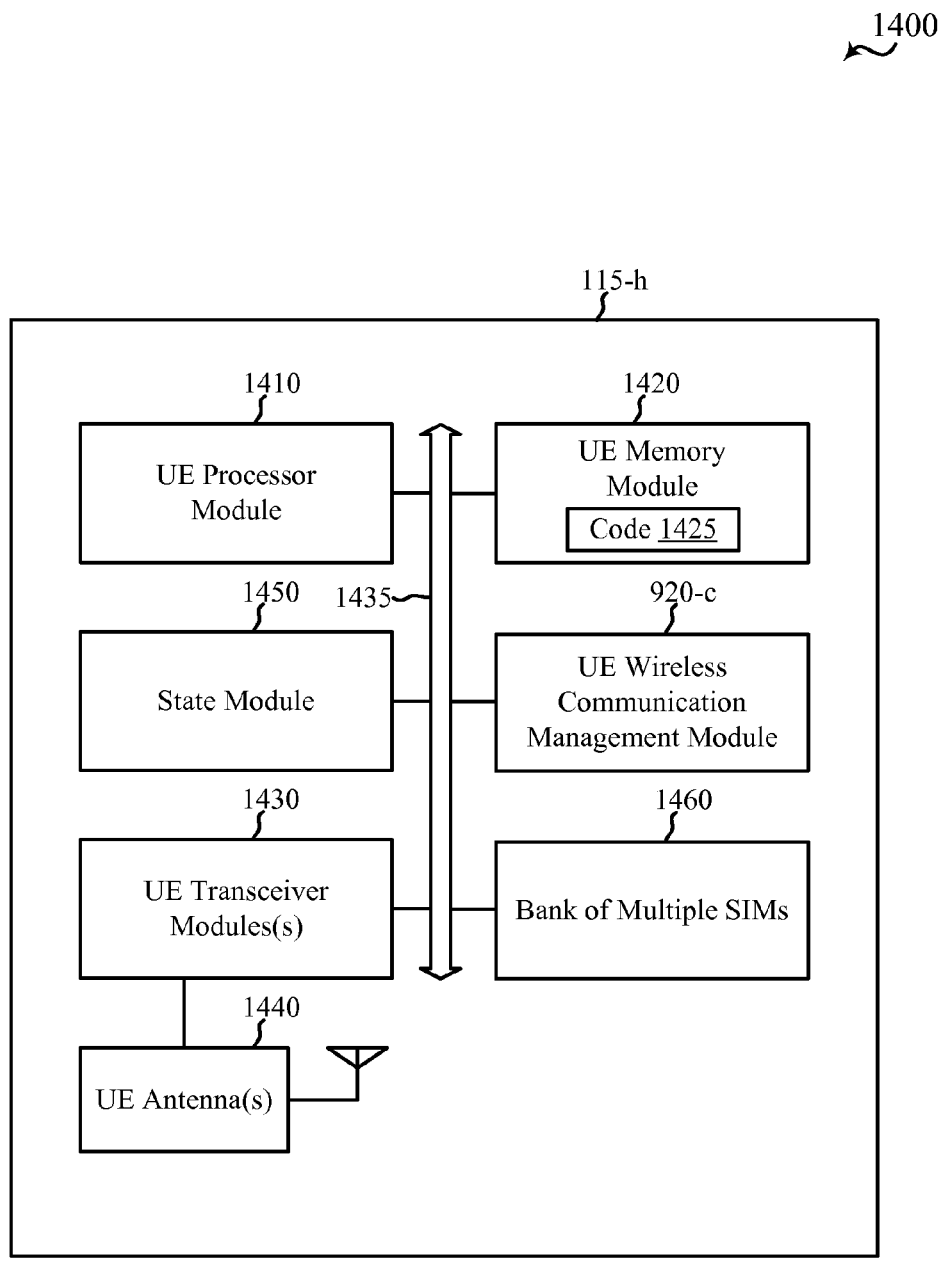
FIG. 14 shows a block diagram of a UE for use in wireless communication, in accordance with various aspects of the present disclosure.

FIG. 14 shows a block diagram 1400 of a UE 115-*h* for use in wireless communication, in accordance with various aspects of the present disclosure. The UE 115-*h* may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 115-*h* may, in some examples, have an internal power supply (not shown), such as a small battery, to facilitate mobile operation. In some examples, the UE 115-*h* may be an example of aspects of one or more of the UEs 115 described with reference to FIG. 1, 2A, 2B, 3, 4, 5, 6, 7, or 8, or aspects of one or more of the devices 915 described with reference to FIG. 9 or 10. The UE 115-*h* may be configured to implement at least some of the UE or device features and functions described with reference to FIG. 1, 2A, 2B, 3, 4, 5, 6, 7, 8, 9, or 10.

The UE 115-*h* may include a UE processor module 1410, a UE memory module 1420, at least one UE transceiver module (represented by UE transceiver module(s) 1430), at least one UE antenna (represented by UE antenna(s) 1440), a UE wireless communication management module 920-*b*, and a bank of multiple SIMs 1460. Each of these components may be in communication with each other, directly or indirectly, over one or more buses 1435.

The UE memory module 1420 may include random access memory (RAM) or read-only memory (ROM). The UE memory module 1420 may store computer-readable, computer-executable code 1425 containing instructions that are configured to, when executed, cause the UE processor module 1410 to perform various functions described herein related to wireless communication, including the notification of at least one network node of a multiple SIM capability of the UE (e.g., the bank of multiple SIMs 1460. Alternatively, the code 1425 may not be directly executable by the UE processor module 1410 but be configured to cause the UE 115-*h* (e.g., when compiled and executed) to perform various of the functions described herein.

The bank of multiple SIMs 1460 may include two or more SIMs, each of which provides a subscription for the UE 115-*h* to access a set of one or more networks.

The UE processor module 1410 may include an intelligent hardware device, e.g., a central processing unit (CPU), a microcontroller, an ASIC, etc. The UE processor module 1410 may process information received through the UE transceiver module(s) 1430 or information to be sent to the UE transceiver module(s) 1430 for transmission through the UE antenna(s) 1440. The UE processor module 1410 may handle, alone or in connection with the UE wireless communication management module 920-*b*, various aspects of communicating over (or managing communications over) at least one radio frequency spectrum.

The UE transceiver module(s) 1430 may include a modem configured to modulate packets and provide the modulated packets to the UE antenna(s) 1440 for transmission, and to demodulate packets received from the UE antenna(s) 1440. The UE transceiver module(s) 1430 may, in some examples, be implemented as one or more UE transmitter modules and one or more separate UE receiver modules. The UE transceiver module(s) 1430 may support communications in at least one radio frequency spectrum. The UE transceiver module(s) 1430 may be configured to communicate bi-directionally, via the UE antenna(s) 1440, with one or more of the network nodes or base stations 105 described with reference to FIG. 1, 3, 4, 5, 6, 7, or 8, or one or more of the devices 1105 described with reference to FIG. 11, 12, or 13. While the UE 115-*h* may include a single UE antenna, there may be examples in which the UE 115-*h* may include multiple UE antennas 1440.

The UE state module 1450 may be used, for example, to manage transitions of the UE 115-*h* between an RRC idle state and an RRC connected state, and may be in communication with other components of the UE 115-*h*, directly or indirectly, over the one or more buses 1435. The UE state module 1450, or portions of it, may include a processor, or some or all of the functions of the UE state module 1450 may be performed by the UE processor module 1410 or in connection with the UE processor module 1410.

The UE wireless communication management module 920-*b* may be configured to perform or control some or all of the UE or device features or functions described with reference to FIG. 1, 2A, 2B, 3, 4, 5, 6, 7, 8, 9, or 10. The UE wireless communication management module 920-*b*, or portions of it, may include a processor, or some or all of the functions of the UE wireless communication management module 920-*b* may be performed by the UE processor module 1410 or in connection with the UE processor module 1410. In some examples, the UE wireless communication management module 920-*b* may be an example of the wireless communication management module 920 described with reference to FIG. 9 or 10.

Figure 15:
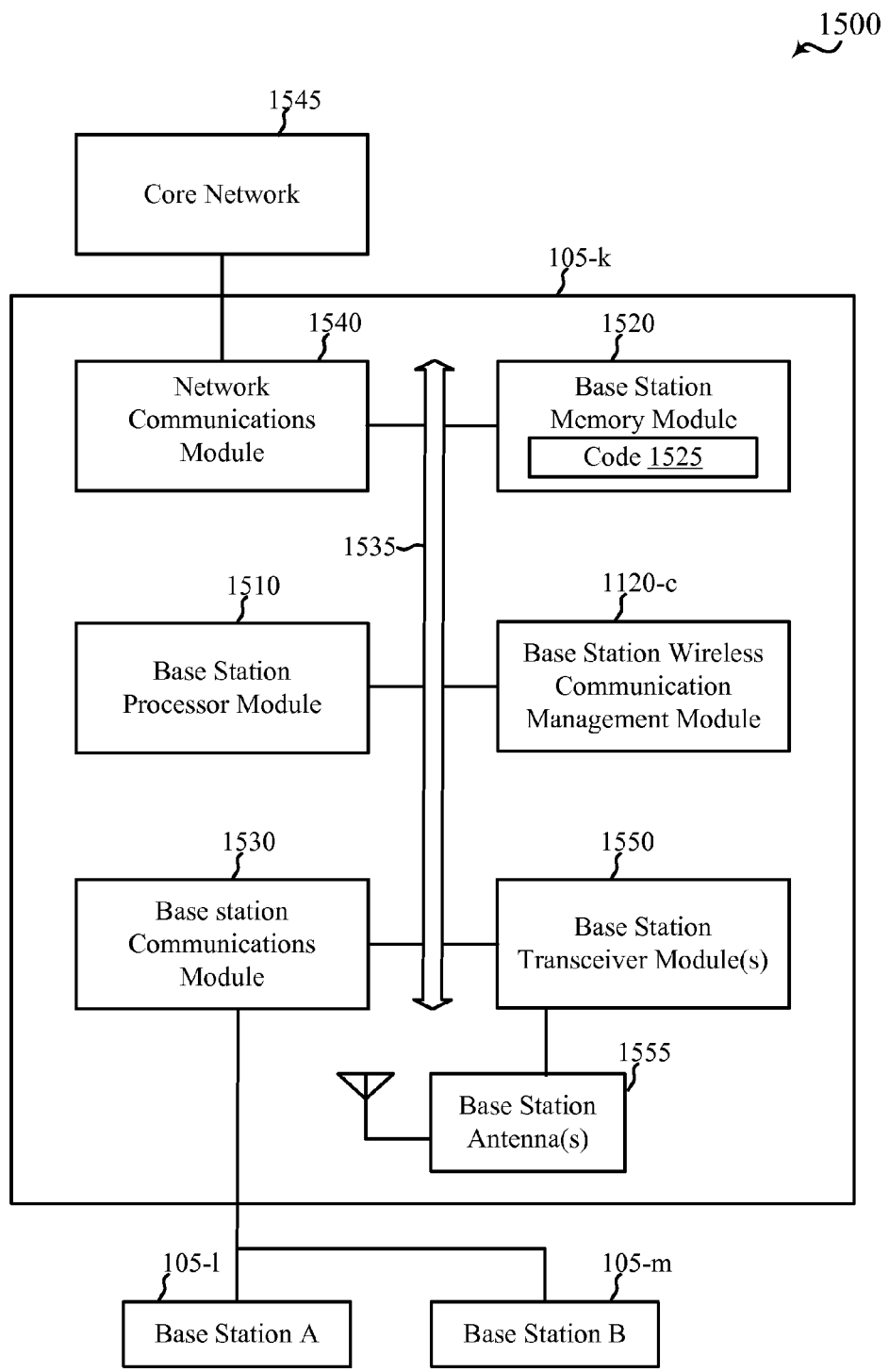
FIG. 15 shows a block diagram of a network node or base station (e.g., a base station forming part or all of an eNB) for use in wireless communication, in accordance with various aspects of the present disclosure.

FIG. 15 shows a block diagram 1500 of a network node or base station 105-*k* (e.g., a base station forming part or all of an eNB) for use in wireless communication, in accordance with various aspects of the present disclosure. In some examples, the network node or base station 105-*k* may be an example of one or more aspects of the network nodes or base stations 105 described with reference to FIG. 1, 3, 4, 5, 6, 7, or 8, or aspects of the devices 1105 described with reference to FIG. 11, 12, or 13. The network node or base station 105-*k* may be configured to implement or facilitate at least some of the base station features and functions described with reference to FIG. 1, 3, 4, 5, 6, 7, 8, 11, 12, or 13.

The base station 105-*k* may include a base station processor module 1510, a base station memory module 1520, at least one base station transceiver module (represented by base station transceiver module(s) 1550), at least one base station antenna (represented by base station antenna(s) 1555), or a base station wireless communication management module 1120-*c*. The base station 105-*k* may also include one or more of a base station communications module 1530 or a network communications module 1540. Each of these components may be in communication with each other, directly or indirectly, over one or more buses 1535.

The base station memory module 1520 may include RAM or ROM. The base station memory module 1520 may store computer-readable, computer-executable code 1525 containing instructions that are configured to, when executed, cause the base station processor module 1510 to perform various functions described herein related to wireless communication, including the modification of one or more communication parameters for a UE in response receiving a notification of a multiple SIM capability of the UE. Alternatively, the code 1525 may not be directly executable by the base station processor module 1510 but be configured to cause the base station 105-*k* (e.g., when compiled and executed) to perform various of the functions described herein.

The base station processor module 1510 may include an intelligent hardware device, e.g., a CPU, a microcontroller, an ASIC, etc. The base station processor module 1510 may process information received through the base station transceiver module(s) 1550, the base station communications module 1530, or the network communications module 1540. The base station processor module 1510 may also process information to be sent to the transceiver module(s) 1550 for transmission through the antenna(s) 1555, to the base station communications module 1530, for transmission to one or more other base stations 105-*l* and 105-*m*, or to the network communications module 1540 for transmission to a core network 1545, which may be an example of one or more aspects of the core network 130 described with reference to FIG. 1. The base station processor module 1510 may handle, alone or in connection with the base station wireless communication management module 1120-*c*, various aspects of communicating over (or managing communications over) at least one radio frequency spectrum.

The base station transceiver module(s) 1550 may include a modem configured to modulate packets and provide the modulated packets to the base station antenna(s) 1555 for transmission, and to demodulate packets received from the base station antenna(s) 1555. The base station transceiver module(s) 1550 may, in some examples, be implemented as one or more base station transmitter modules and one or more separate base station receiver modules. The base station transceiver module(s) 1550 may support communications in at least one radio frequency spectrum. The base station transceiver module(s) 1550 may be configured to communicate bi-directionally, via the antenna(s) 1555, with one or more UEs or devices, such as one or more of the UEs 115 described with reference to FIG. 1, 2A, 2B, 3, 4, 5, 6, 7, or 8, or one or more of the devices 915 described with reference to FIG. 9 or 10. The base station 105-*k* may, for example, include multiple base station antennas 1555 (e.g., an antenna array). The base station 105-*k* may communicate with the core network 1545 through the network communications module 1540. The base station 105-*k* may also communicate with other base stations, such as the base stations 105-*l* and 105-*m*, using the base station communications module 1530.

The base station wireless communication management module 1120-*c* may be configured to perform or control some or all of the features or functions described with reference to FIG. 1, 3, 4, 5, 6, 7, 8, 11, 12, or 13. The base station wireless communication management module 1120-*c*, or portions of it, may include a processor, or some or all of the functions of the base station wireless communication management module 1120-*c* may be performed by the base station processor module 1510 or in connection with the base station processor module 1510.

Figure 16:
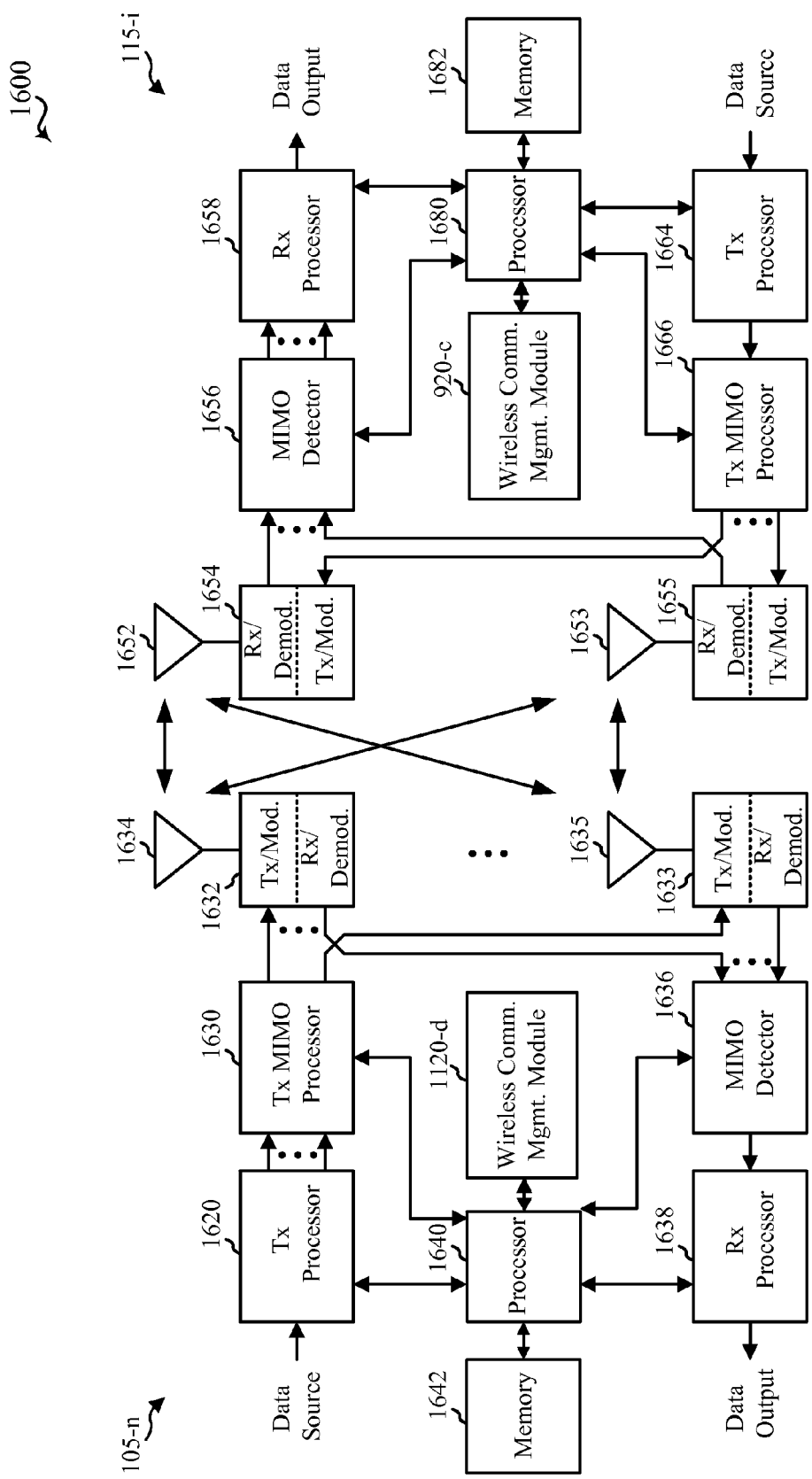
FIG. 16 is a block diagram of a multiple input/multiple output (MIMO) communication system including a base station and a UE, in accordance with various aspects of the present disclosure.

FIG. 16 is a block diagram of a multiple input/multiple output (MIMO) communication system 1600 including a base station 105-*n* and a UE 115-*i*, in accordance with various aspects of the present disclosure. The MIMO communication system 1600 may illustrate aspects of the wireless communication system 100, 300, 700, or 800 described with reference to FIG. 1, 3, 7, or 8. The base station 105-*n* may be an example of aspects of the base station 105 described with reference to FIG. 1, 3, 4, 5, 6, 7, 8, or 15, or aspects of the device 1105 described with reference to FIG. 11, 12, or 13. The base station 105-*n* may be equipped with antennas 1634 through 1635, and the UE 115-*i* may be equipped with antennas 1652 through 1653. In the MIMO communication system 1600, the base station 105-*n* may be able to send data over multiple communication links at the same time. Each communication link may be called a "layer" and the "rank" of the communication link may indicate the number of layers used for communication. For example, in a 2×2 MIMO communications system where base station 105-*n* transmits two "layers," the rank of the communication link between the base station 105-*n* and the UE 115-*i* is two.

At the base station 105-*n*, a transmit processor 1620 may receive data from a data source. The transmit processor 1620 may process the data. The transmit processor 1620 may also generate control symbols or reference symbols. A transmit (Tx) MIMO processor 1630 may perform spatial processing (e.g., precoding) on data symbols, control symbols, or reference symbols, if applicable, and may provide output symbol streams to the transmit modulators 1632 through 1633. Each modulator 1632 through 1633 may process a respective output symbol stream (e.g., for OFDM, etc.) to obtain an output sample stream. Each modulator 1632 through 1633 may further process (e.g., convert to analog, amplify, filter, and upconvert) the output sample stream to obtain a DL signal. In one example, DL signals from modulators 1632 through 1633 may be transmitted via the antennas 1634 through 1635, respectively.

The UE 115-*i* may be an example of aspects of the UE 115 described with reference to FIG. 1, 2A, 2B, 3, 4, 5, 6, 7, 8, or 14, or aspects of the device 915 described with reference to FIG. 9 or 10. At the UE 115-*i*, the UE antennas 1652 through 1653 may receive the DL signals from the base station 105-*n* and may provide the received signals to the demodulators 1654 through 1655, respectively. Each demodulator 1654 through 1655 may condition (e.g., filter, amplify, downconvert, and digitize) a respective received signal to obtain input samples. Each demodulator 1654 through 1655 may further process the input samples (e.g., for OFDM, etc.) to obtain received symbols. A MIMO detector 1656 may obtain received symbols from all the demodulators 1654 through 1655, perform MIMO detection on the received symbols, if applicable, and provide detected symbols. A receive (Rx) processor 1658 may process (e.g., demodulate, deinterleave, and decode) the detected symbols, providing decoded data for the UE 115-*i* to a data output, and provide decoded control information to a processor 1680, or memory 1682.

The processor 1680 may in some cases execute stored instructions to instantiate a wireless communication management module 920-*c*. The wireless communication management module 920-*c* may be an example of aspects of the wireless communication management module 920 described with reference to FIG. 9, 10, or 14.

On the uplink (UL), at the UE 115-*i*, a transmit processor 1664 may receive and process data from a data source. The transmit processor 1664 may also generate reference symbols for a reference signal. The symbols from the transmit processor 1664 may be precoded by a transmit MIMO processor 1666 if applicable, further processed by the modulators 1654 through 1655 (e.g., for SC-FDMA, etc.), and be transmitted to the base station 105-*n* in accordance with the transmission parameters received from the base station 105-*n*. At the base station 105-*n*, the UL signals from the UE 115-*i* may be received by the antennas 1634 through 1635, processed by the demodulators 1632 through 1633, detected by a MIMO detector 1636 if applicable, and further processed by a receive processor 1638. The receive processor 1638 may provide decoded data to a data output and to the processor 1640 or memory 1642.

The processor 1640 may in some cases execute stored instructions to instantiate a wireless communication management module 1120-*d*. The wireless communication management module 1120-*d* may be an example of aspects of the wireless communication management module 1120 described with reference to FIG. 11, 12, 13, or 15.

The components of the UE 115-*i* may, individually or collectively, be implemented with one or more ASICs adapted to perform some or all of the applicable functions in hardware. Each of the noted modules may be a means for performing one or more functions related to operation of the MIMO communication system 1600. Similarly, the components of the base station 105-*n* may, individually or collectively, be implemented with one or more ASICs adapted to perform some or all of the applicable functions in hardware. Each of the noted components may be a means for performing one or more functions related to operation of the MIMO communication system 1600.

Figure 17:
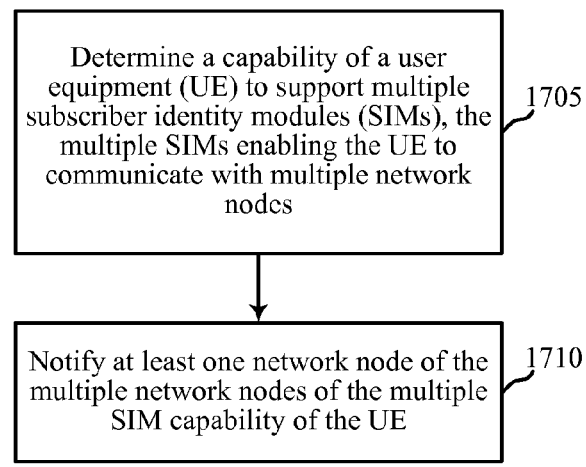
FIG. 17 is a flow chart illustrating an exemplary method for wireless communication, in accordance with various aspects of the present disclosure.

FIG. 17 is a flow chart illustrating an exemplary method 1700 for wireless communication, in accordance with various aspects of the present disclosure. For clarity, the method 1700 is described below with reference to aspects of one or more of the UEs 115 described with reference to FIG. 1, 2A, 2B, 3, 4, 5, 7, 8, 14, or 16, or aspects of one or more of the devices 915 described with reference to FIG. 9 or 10. In some examples, a UE or device may execute one or more sets of codes to control the functional elements of the UE or device to perform the functions described below. Additionally or alternatively, the UE or device may perform one or more of the functions described below using special-purpose hardware.

At block 1705, the method 1700 may include determining a capability of a UE to support multiple SIMs. The multiple SIMs may enable the UE to communicate with multiple network nodes (e.g., multiple base stations). In some examples, a first SIM of the UE may enable the UE to communicate with a first network node associated with a first provider (e.g., a first PLMN or MNO), and a second SIM of the UE may enable the UE to communicate with a second network node associated with a second provider. In some examples, the operation(s) at block 1705 may be performed using the wireless communication management module 920 described with reference to FIG. 9, 10, 14, or 16, or the SIM management module 935 described with reference to FIG. 9 or 10.

At block 1710, the method 1700 may include notifying at least one network node of the multiple network nodes of the multiple SIM capability of the UE. In some examples, the operation(s) at block 1710 may be performed using the wireless communication management module 920 described with reference to FIG. 9, 10, 14, or 16, or the UE capability notification module 940 described with reference to FIG. 9 or 10.

Thus, the method 1700 may provide for wireless communication. It should be noted that the method 1700 is just one implementation and that the operations of the method 1700 may be rearranged or otherwise modified such that other implementations are possible.

Figure 18:
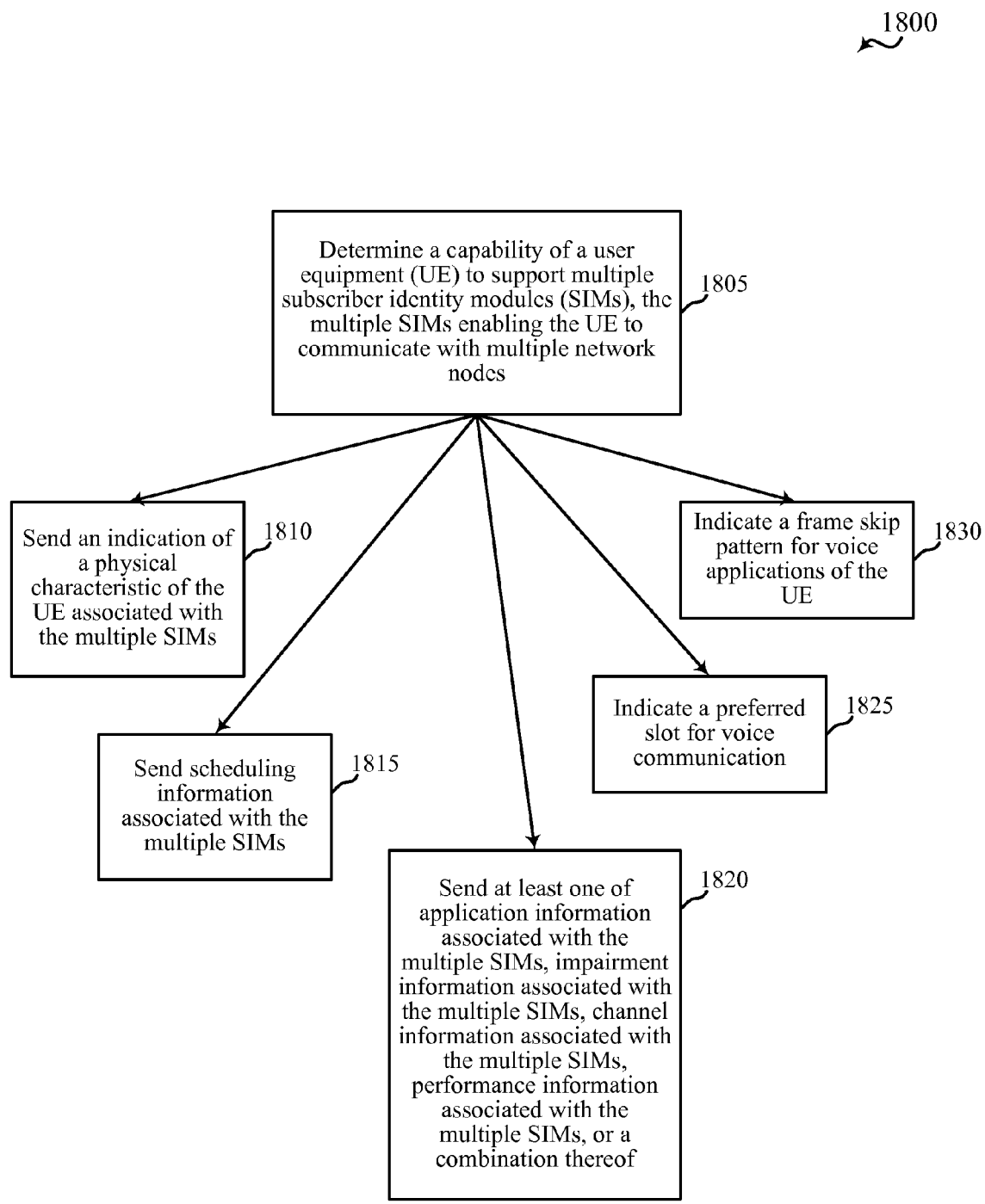
FIG. 18 is a flow chart illustrating an exemplary method for wireless communication, in accordance with various aspects of the present disclosure.

FIG. 18 is a flow chart illustrating an exemplary method 1800 for wireless communication, in accordance with various aspects of the present disclosure. For clarity, the method 1800 is described below with reference to aspects of one or more of the UEs 115 described with reference to FIG. 1, 2A, 2B, 3, 4, 5, 7, 8, 14, or 16, or aspects of one or more of the devices 915 described with reference to FIG. 9 or 10. In some examples, a UE or device may execute one or more sets of codes to control the functional elements of the UE or device to perform the functions described below. Additionally or alternatively, the UE or device may perform one or more of the functions described below using special-purpose hardware.

At block 1805, the method 1800 may include determining a capability of a UE to support multiple SIMs. The multiple SIMs may enable the UE to communicate with multiple network nodes (e.g., multiple base stations). In some examples, a first SIM of the UE may enable the UE to communicate with a first network node associated with a first provider (e.g., a first PLMN or MNO), and a second SIM of the UE may enable the UE to communicate with a second network node associated with a second provider. In some examples, the operation(s) at block 1805 may be performed using the wireless communication management module 920 described with reference to FIG. 9, 10, 14, or 16, or the SIM management module 935 described with reference to FIG. 9 or 10.

At blocks 1810, 1815, 1820, 1825, or 1830, the method 1800 may include notifying at least one network node of the multiple network nodes of the multiple SIM capability of the UE. More particularly, and at block 1810, the method 1800 may include sending an indication of a physical characteristic of the UE associated with the multiple SIMs. The physical characteristic may include, for example, at least one of a number of SIMs in the UE, a number of transmit chains available in the UE, a number of receive chains available in the UE, a number of transmit chains available per SIM in the UE, a number of receive chains available per SIM in the UE, an indication of transmit chain sharing, an indication of receive chain sharing, or a combination thereof. In some examples, the operation(s) at block 1810 may be performed using the wireless communication management module 920 described with reference to FIG. 9, 10, 14, or 16, or the physical characteristic notification management module 1005 described with reference to FIG. 10.

At block 1815, the method 1800 may include sending scheduling information associated with the multiple SIMs. The scheduling information may include at least one of uplink scheduling information, downlink scheduling information, power savings scheduling information, or a combination thereof. In some examples, the operation(s) at block 1815 may be performed using the wireless communication management module 920 described with reference to FIG. 9, 10, 14, or 16, or the scheduling information notification management module 1010 described with reference to FIG. 10.

At block 1820, the method 1800 may include sending at least one of application information associated with the multiple SIMs, impairment information associated with the multiple SIMs, channel information associated with the multiple SIMs, performance information associated with the multiple SIMs, or a combination thereof. The application information may include at least one of applications supported per SIM in the UE, application priority information, an application layer buffer status, an application QoS, or a combination thereof. The impairment information may include at least one of a transmit blanking schedule, a receive blanking schedule, or a combination thereof. The channel information may include at least one of a channel estimation, a pathloss, or a combination thereof. The performance information may include at least one of a transmit performance metric, a target transmit blanking rate, a target uplink channel FER, a receive performance metric, a measured downlink channel BLER, a measured downlink channel FER, a measured downlink channel MOS, a measured downlink channel throughput, a measured downlink channel latency, a measured downlink channel jitter, a semi-static performance metric, a dynamic performance metric, an application-specific performance metric, or a combination thereof. In some examples, the operation(s) at block 1820 may be performed using the wireless communication management module 920 described with reference to FIG. 9, 10, 14, or 16, or the application information notification management module 1015, the impairment information notification management module 1020, the channel information notification management module 1025, or the performance information notification management module 1030 described with reference to FIG. 10.

At block 1825, the method 1800 may include indicating a preferred slot for voice communication. The preferred slot may be based on at least one of a receive parameter of a non-voice transmission, a transmit parameter of a non-voice transmission, or a combination thereof. In some examples, the operation(s) at block 1825 may be performed using the wireless communication management module 920 described with reference to FIG. 9, 10, 14, or 16, or the voice communication notification management module 1035 described with reference to FIG. 10.

At block 1830, the method 1800 may include indicating a frame skip pattern for voice applications of the UE. In some embodiments, the method 1800 may further include adapting the frame skip pattern based on channel conditions and performance metrics of the multiple network nodes. In some examples, the operation(s) at block 1830 may be performed using the wireless communication management module 920 described with reference to FIG. 9, 10, 14, or 16, or the voice communication notification management module 1035 described with reference to FIG. 10.

By way of example, the various operations at blocks 1810, 1815, 1820, 1825, and 1830 may be performed in the alternative, in parallel, or serially.

Thus, the method 1800 may provide for wireless communication. It should be noted that the method 1800 is just one implementation and that the operations of the method 1800 may be rearranged or otherwise modified such that other implementations are possible.

Figure 19:
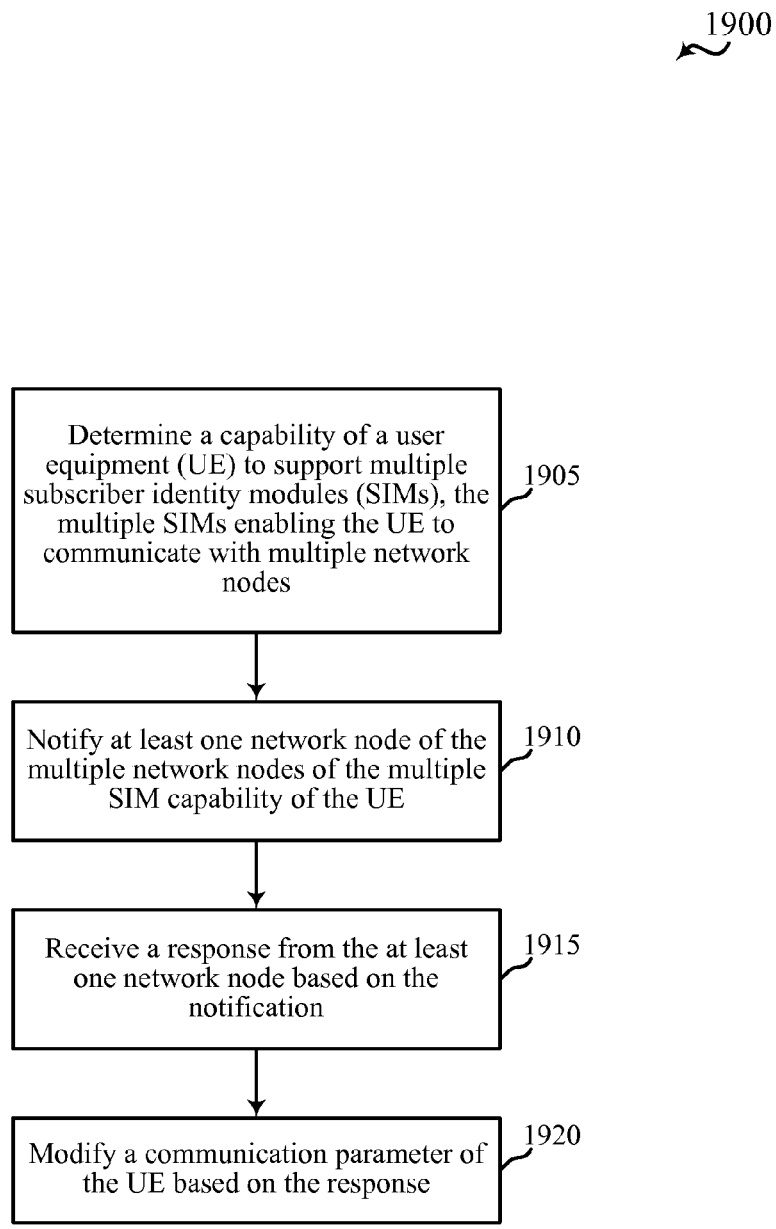
FIG. 19 is a flow chart illustrating an exemplary method for wireless communication, in accordance with various aspects of the present disclosure.

FIG. 19 is a flow chart illustrating an exemplary method 1900 for wireless communication, in accordance with various aspects of the present disclosure. For clarity, the method 1900 is described below with reference to aspects of one or more of the UEs 115 described with reference to FIG. 1, 2A, 2B, 3, 4, 5, 7, 8, 14, or 16, or aspects of one or more of the devices 915 described with reference to FIG. 9 or 10. In some examples, a UE or device may execute one or more sets of codes to control the functional elements of the UE or device to perform the functions described below. Additionally or alternatively, the UE or device may perform one or more of the functions described below using special-purpose hardware.

At block 1905, the method 1900 may include determining a capability of a UE to support multiple SIMs. The multiple SIMs may enable the UE to communicate with multiple network nodes (e.g., multiple base stations). In some examples, a first SIM of the UE may enable the UE to communicate with a first network node associated with a first provider (e.g., a first PLMN or MNO), and a second SIM of the UE may enable the UE to communicate with a second network node associated with a second provider. In some examples, the operation(s) at block 1905 may be performed using the wireless communication management module 920 described with reference to FIG. 9, 10, 14, or 16, or the SIM management module 935 described with reference to FIG. 9 or 10.

At block 1910, the method 1900 may include notifying at least one network node of the multiple network nodes of the multiple SIM capability of the UE. In some examples, the operation(s) at block 1910 may be performed using the wireless communication management module 920 described with reference to FIG. 9, 10, 14, or 16, or the UE capability notification module 940 described with reference to FIG. 9 or 10.

At block 1915, the method 1900 may include receiving a response from the at least one network node based on the notification. In some cases, the response may include an uplink channel performance metric. In some examples, the operation(s) at block 1915 may be performed using the wireless communication management module 920 described with reference to FIG. 9, 10, 14, or 16, or the response processing module 1040 described with reference to FIG. 10.

At block 1920, the method 1900 may modifying a communication parameter of the UE based on the response. In some examples, the communication parameter may include at least one of a downlink scheduling parameter, an uplink scheduling parameter, a timer, a transmit blanking parameter, a receive blanking parameter, an application prioritization parameter, an RRC state, an MCS-related parameter (e.g., an ETFCI), a paging occasion, or a combination thereof. In some examples, the communication parameter may include a slot to be used for voice communication. The slot may be based on at least one of a receive parameter of a non-voice transmission, a transmit parameter of a non-voice transmission, or a combination thereof. In some examples, the communication parameter may include a frame skip pattern for voice applications of the UE. In these examples, the method 1900 may include adapting the frame skip pattern based on channel conditions and performance metrics of the multiple network nodes. In some examples, the operation(s) at block 1920 may be performed using the wireless communication management module 920 described with reference to FIG. 9, 10, 14, or 16, or the communication parameter management module 1045 described with reference to FIG. 10.

Thus, the method 1900 may provide for wireless communication. It should be noted that the method 1900 is just one implementation and that the operations of the method 1900 may be rearranged or otherwise modified such that other implementations are possible.

Figure 20:
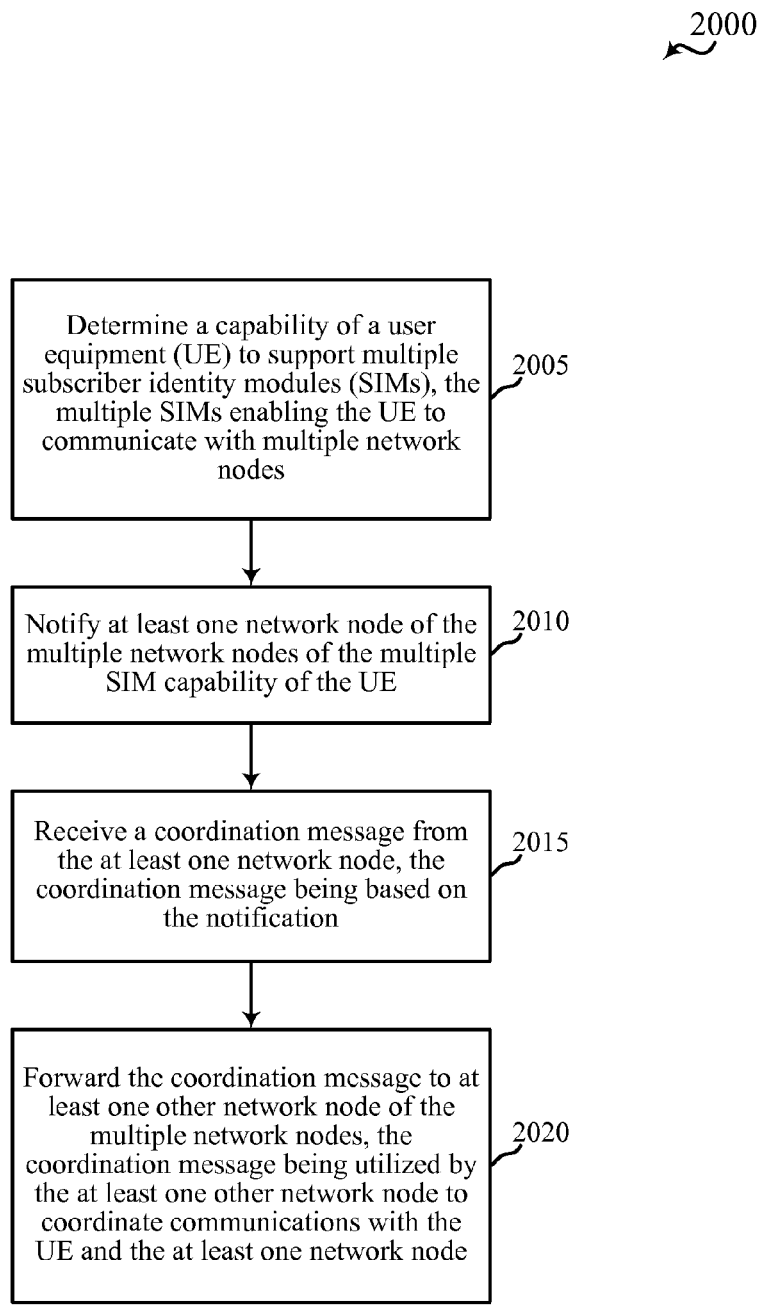
FIG. 20 is a flow chart illustrating an exemplary method for wireless communication, in accordance with various aspects of the present disclosure.

FIG. 20 is a flow chart illustrating an exemplary method 2000 for wireless communication, in accordance with various aspects of the present disclosure. For clarity, the method 2000 is described below with reference to aspects of one or more of the UEs 115 described with reference to FIG. 1, 2A, 2B, 3, 4, 5, 7, 8, 14, or 16, or aspects of one or more of the devices 915 described with reference to FIG. 9 or 10. In some examples, a UE or device may execute one or more sets of codes to control the functional elements of the UE or device to perform the functions described below. Additionally or alternatively, the UE or device may perform one or more of the functions described below using special-purpose hardware.

At block 2005, the method 2000 may include determining a capability of a UE to support multiple SIMs. The multiple SIMs may enable the UE to communicate with multiple network nodes (e.g., multiple base stations). In some examples, a first SIM of the UE may enable the UE to communicate with a first network node associated with a first provider (e.g., a first PLMN or MNO), and a second SIM of the UE may enable the UE to communicate with a second network node associated with a second provider. In some examples, the operation(s) at block 2005 may be performed using the wireless communication management module 920 described with reference to FIG. 9, 10, 14, or 16, or the SIM management module 935 described with reference to FIG. 9 or 10.

At block 2010, the method 2000 may include notifying at least one network node of the multiple network nodes of the multiple SIM capability of the UE. In some examples, the operation(s) at block 2010 may be performed using the wireless communication management module 920 described with reference to FIG. 9, 10, 14, or 16, or the UE capability notification module 940 described with reference to FIG. 9 or 10.

At block 2015, the method 2000 may include receiving a coordination message from the at least one network node. The coordination message may be based on the notification. In some embodiments, the at least one network node may be associated with a first provider, and the at least one other network node may be associated with a second provider. In some examples, the operation(s) at block 2015 may be performed using the wireless communication management module 920 described with reference to FIG. 9, 10, 14, or 16, or the network coordination module 1050 described with reference to FIG. 10.

At block 2020, the method 2000 may include forwarding the coordination message to at least one other network node of the multiple network nodes. The coordination message may be utilized by the at least one other network node to coordinate communications with the UE and the at least one network node. In some examples, the operation(s) at block 2020 may be performed using the wireless communication management module 920 described with reference to FIG. 9, 10, 14, or 16, or the network coordination module 1050 described with reference to FIG. 10.

Thus, the method 2000 may provide for wireless communication. It should be noted that the method 2000 is just one implementation and that the operations of the method 2000 may be rearranged or otherwise modified such that other implementations are possible.

In some examples, aspects from two or more of the methods 1700, 1800, 1900, or 2000 described with reference to FIG. 17, 18, 19, or 20 may be combined.

Figure 21:
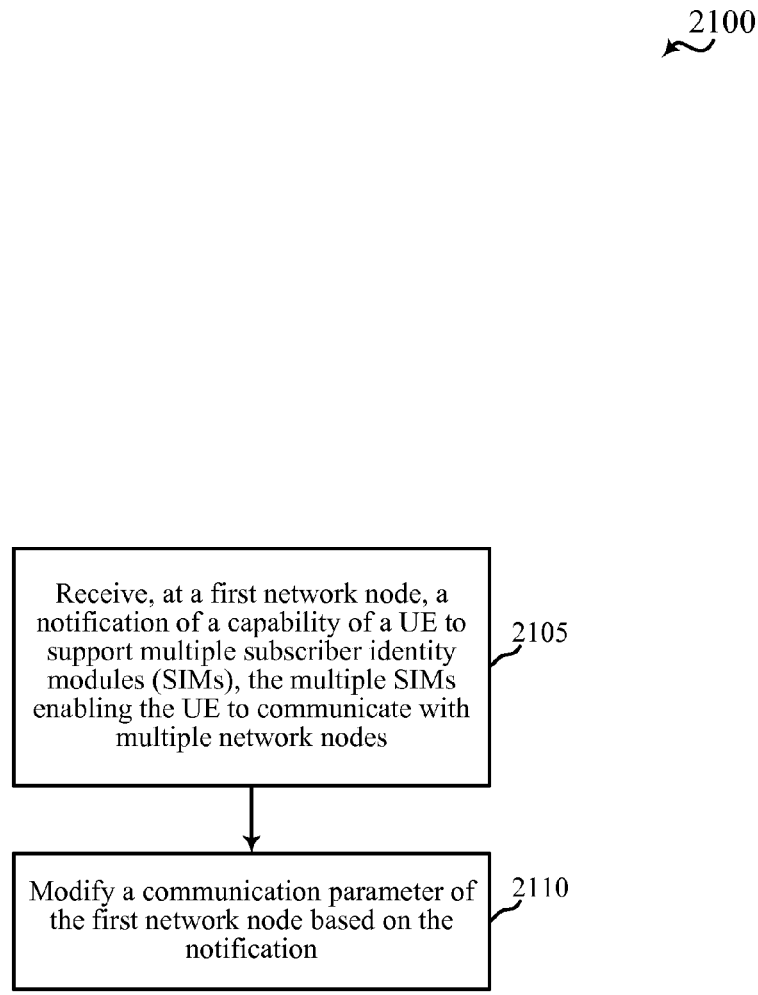
FIG. 21 is a flow chart illustrating an exemplary method for wireless communication, in accordance with various aspects of the present disclosure.

FIG. 21 is a flow chart illustrating an exemplary method 2100 for wireless communication, in accordance with various aspects of the present disclosure. For clarity, the method 2100 is described below with reference to aspects of one or more of the network nodes or base stations 105 described with reference to FIG. 1, 3, 4, 5, 7, 8, 15, or 16, or aspects of one or more of the devices 1115 described with reference to FIG. 11, 12, or 13. In some examples, a base station, network node, or device may execute one or more sets of codes to control the functional elements of the base station, network node, or device to perform the functions described below. Additionally or alternatively, the base station, network node, or device may perform one or more of the functions described below using special-purpose hardware.

At block 2105, the method 2100 may include receiving, at a first network node, a notification of a capability of a UE to support multiple SIMs. The multiple SIMs may enable the UE to communicate with multiple network nodes (e.g., multiple base stations). In some examples, a first SIM of the UE may enable the UE to communicate with the first network node, and a second SIM of the UE may enable the UE to communicate with a second network node. In some cases, the first network node may be associated with a first provider (e.g., a first PLMN or MNO), and the second network node may be associated with a second provider. In some examples, the operation(s) at block 2105 may be performed using the wireless communication management module 1120 described with reference to FIG. 11, 12, 13, 15, or 16, or UE capability determination module 1135 described with reference to FIG. 11, 12, or 13.

At block 2110, the method 2100 may include modifying a communication parameter of the first network node based on the notification. In some examples, the communication parameter may include at least one of a downlink scheduling parameter, an uplink scheduling parameter, an application prioritization parameter, a performance metric, a radio access technology used by the UE, or a combination thereof. In some examples, modifying the communication parameter may include selecting a radio access technology for at least one of the SIMs, and notifying the UE of the selection. In some examples, the operation(s) at block 2110 may be performed using the wireless communication management module 1120 described with reference to FIG. 11, 12, 13, 15, or 16, or communication parameter modification module 1140 described with reference to FIG. 11, 12, or 13.

In some embodiments of the method 2100, the may first network node may be associated with a first network, and the method 2100 may include receiving from the UE an identifier of at least a second network. The UE may be in communication with the second network via the second SIM. In some cases, the first network node may communicate with the second network directly or via the UE.

Thus, the method 2100 may provide for wireless communication. It should be noted that the method 2100 is just one implementation and that the operations of the method 2100 may be rearranged or otherwise modified such that other implementations are possible.

Figure 22:
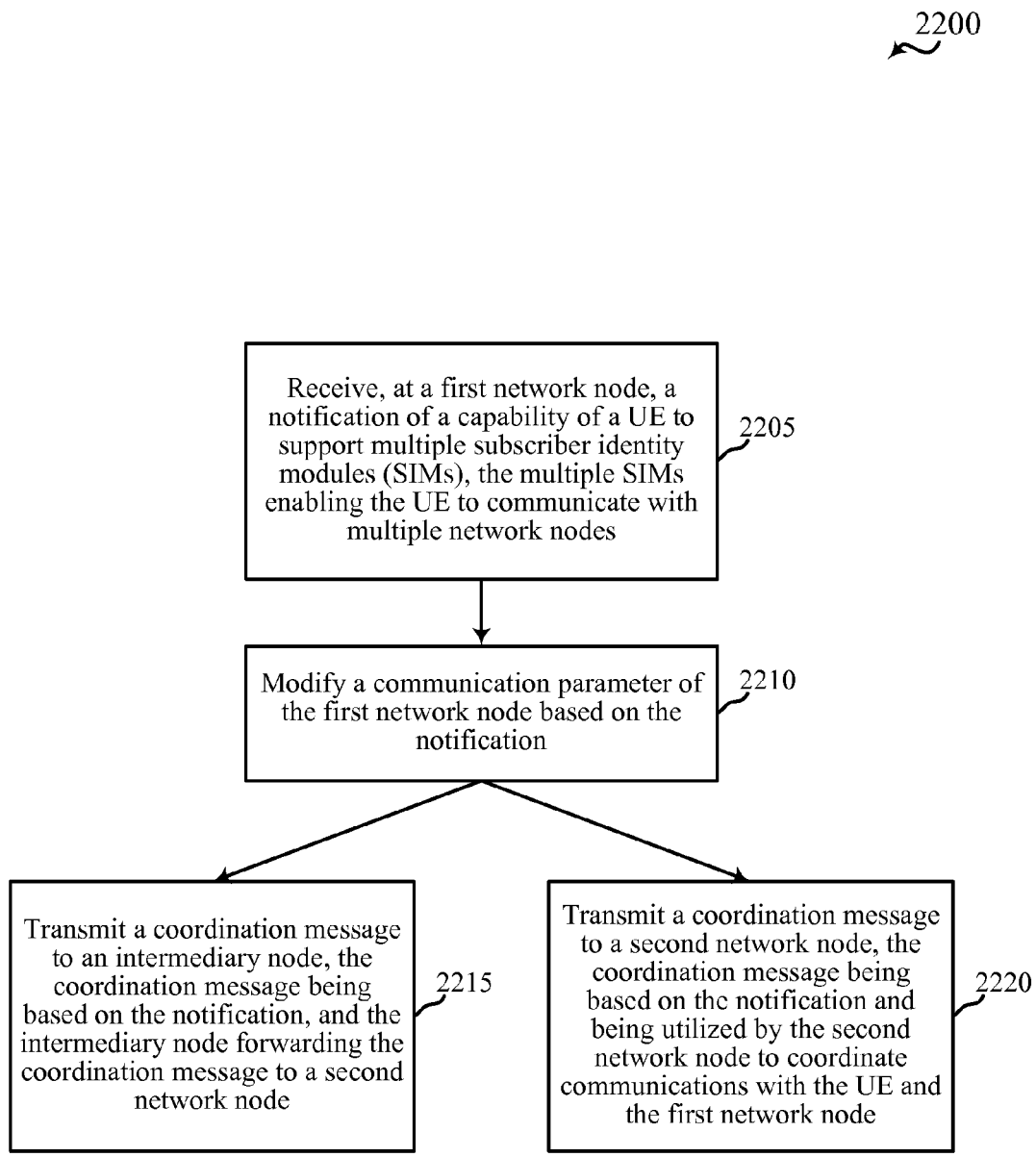
FIG. 22 is a flow chart illustrating an exemplary method for wireless communication, in accordance with various aspects of the present disclosure.

FIG. 22 is a flow chart illustrating an exemplary method 2200 for wireless communication, in accordance with various aspects of the present disclosure. For clarity, the method 2200 is described below with reference to aspects of one or more of the network nodes or base stations 105 described with reference to FIG. 1, 3, 4, 5, 7, 8, 15, or 16, or aspects of one or more of the devices 1115 described with reference to FIG. 11, 12, or 13. In some examples, a base station, network node, or device may execute one or more sets of codes to control the functional elements of the base station, network node, or device to perform the functions described below. Additionally or alternatively, the base station, network node, or device may perform one or more of the functions described below using special-purpose hardware.

At block 2205, the method 2200 may include receiving, at a first network node, a notification of a capability of a UE to support multiple SIMs. The multiple SIMs may enable the UE to communicate with multiple network nodes (e.g., multiple base stations). In some examples, a first SIM of the UE may enable the UE to communicate with the first network node, and a second SIM of the UE may enable the UE to communicate with a second network node. In some cases, the first network node may be associated with a first provider (e.g., a first PLMN or MNO), and the second network node may be associated with a second provider. In some examples, the operation(s) at block 2205 may be performed using the wireless communication management module 1120 described with reference to FIG. 11, 12, 13, 15, or 16, or UE capability determination module 1135 described with reference to FIG. 11, 12, or 13.

At block 2210, the method 2200 may include modifying a communication parameter of the first network node based on the notification. In some examples, the communication parameter may include at least one of a downlink scheduling parameter, an uplink scheduling parameter, an application prioritization parameter, a performance metric, a radio access technology used by the UE, or a combination thereof. In some examples, modifying the communication parameter may include selecting a radio access technology for at least one of the SIMs, and notifying the UE of the selection. In some examples, the operation(s) at block 2210 may be performed using the wireless communication management module 1120 described with reference to FIG. 11, 12, 13, 15, or 16, or communication parameter modification module 1140 described with reference to FIG. 11, 12, or 13.

At block 2215 or 2220, the method 2200 may include transmitting a coordination message. More particularly, and at block 2215, the method 2200 may include transmitting a coordination message to an intermediary node. The coordination message may be based on the notification of the capability of the UE to support multiple SIMs. The intermediary node may forward the coordination message to a second network node. In some examples, the intermediary node may include at least one of the UE or an authentication server, and in some examples, the first network node and the second network node may be associated with different providers (e.g., a first provider and a second provider, respectively). In some examples, the operation(s) at block 2215 may be performed using the wireless communication management module 1120 described with reference to FIG. 11, 12, 13, 15, or 16, or network coordination module 1205 described with reference to FIG. 12.

At block 2220, the method 2200 may include transmitting a coordination message to a second network node. The coordination message may be based on the notification of the capability of the UE to support multiple SIMs, and may be used by the second network node to coordinate communications with the UE and/or the first network node. In some examples, the first network node and the second network node may be associated with a same provider. In some examples, the operation(s) at block 2220 may be performed using the wireless communication management module 1120 described with reference to FIG. 11, 12, 13, 15, or 16, or network coordination module 1205 described with reference to FIG. 12.

In some embodiments of the method 2200, the first network node may be associated with a first network, and the method 2200 may include receiving from the UE an identifier of at least a second network. The UE may be in communication with the second network via the second SIM. In some cases, the first network node may communicate with the second network directly or via the UE.

Thus, the method 2200 may provide for wireless communication. It should be noted that the method 2200 is just one implementation and that the operations of the method 2200 may be rearranged or otherwise modified such that other implementations are possible.

Figure 23:
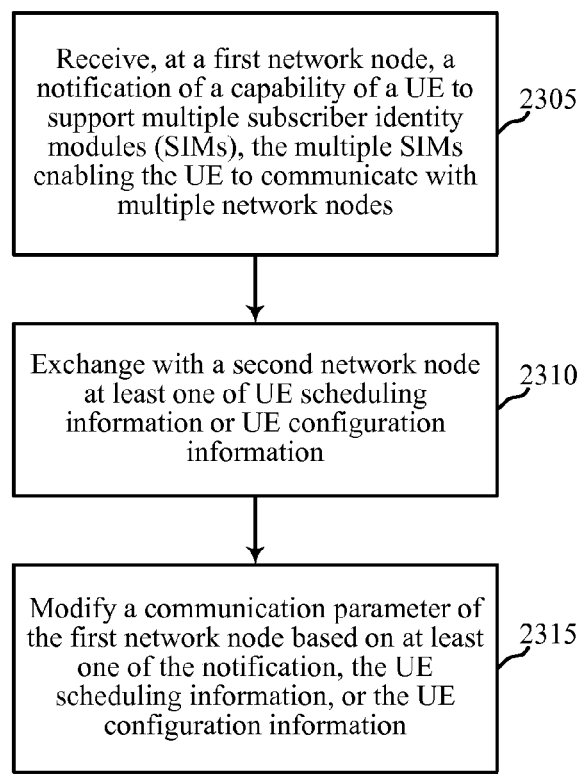
FIG. 23 is a flow chart illustrating an exemplary method for wireless communication, in accordance with various aspects of the present disclosure.

FIG. 23 is a flow chart illustrating an exemplary method 2300 for wireless communication, in accordance with various aspects of the present disclosure. For clarity, the method 2300 is described below with reference to aspects of one or more of the network nodes or base stations 105 described with reference to FIG. 1, 3, 4, 5, 7, 8, 15, or 16, or aspects of one or more of the devices 1115 described with reference to FIG. 11, 12, or 13. In some examples, a base station, network node, or device may execute one or more sets of codes to control the functional elements of the base station, network node, or device to perform the functions described below. Additionally or alternatively, the base station, network node, or device may perform one or more of the functions described below using special-purpose hardware.

At block 2305, the method 2300 may include receiving, at a first network node, a notification of a capability of a UE to support multiple SIMs. The multiple SIMs may enable the UE to communicate with multiple network nodes (e.g., multiple base stations). In some examples, a first SIM of the UE may enable the UE to communicate with the first network node, and a second SIM of the UE may enable the UE to communicate with a second network node. In some cases, the first network node may be associated with a first provider (e.g., a first PLMN or MNO), and the second network node may be associated with a second provider. In some examples, the operation(s) at block 2305 may be performed using the wireless communication management module 1120 described with reference to FIG. 11, 12, 13, 15, or 16, or UE capability determination module 1135 described with reference to FIG. 11, 12, or 13.

At block 2310, the method 2300 may include exchanging with a second network node at least one of UE scheduling information or UE configuration information. In some examples, the exchanging may include receiving UE scheduling information from the second network node. In some examples, the operation(s) at block 2310 may be performed using the wireless communication management module 1120 described with reference to FIG. 11, 12, 13, 15, or 16, or the UE-specific information exchange module 1305 described with reference to FIG. 13.

In some embodiments, the first network node may be associated with a first network and the second network node may be associated with a second network. In these embodiments, the UE scheduling information may include information compiled over more than one frame. In other embodiments, the first and second network nodes may be associated with the same network. In these latter embodiments, the UE scheduling information may include information compiled over one of a single frame or a partial frame.

In some examples of the method 2300, a UE-assisted security procedure may be triggered before exchanging the UE scheduling information or UE configuration information with the second node. In some examples, the UE-assisted security procedure may be managed by the wireless communication management module 1120 described with reference to FIG. 11, 12, 13, 15, or 16, or the security procedure management module 1310 described with reference to FIG. 13.

At block 2315, the method 2300 may include modifying a communication parameter of the first network node based on the notification of the capability of the UE to support multiple SIMs, and/or the UE scheduling information or UE configuration information received at block 2310. In some examples, the communication parameter may include at least one of a downlink scheduling parameter, an uplink scheduling parameter, an application prioritization parameter, a performance metric, a radio access technology used by the UE, or a combination thereof. In some examples, modifying the communication parameter may include selecting a radio access technology for at least one of the SIMs, and notifying the UE of the selection. In some examples, the operation(s) at block 2315 may be performed using the wireless communication management module 1120 described with reference to FIG. 11, 12, 13, 15, or 16, or communication parameter modification module 1140 described with reference to FIG. 11, 12, or 13.

Thus, the method 2300 may provide for wireless communication. It should be noted that the method 2300 is just one implementation and that the operations of the method 2300 may be rearranged or otherwise modified such that other implementations are possible.

Figure 24:
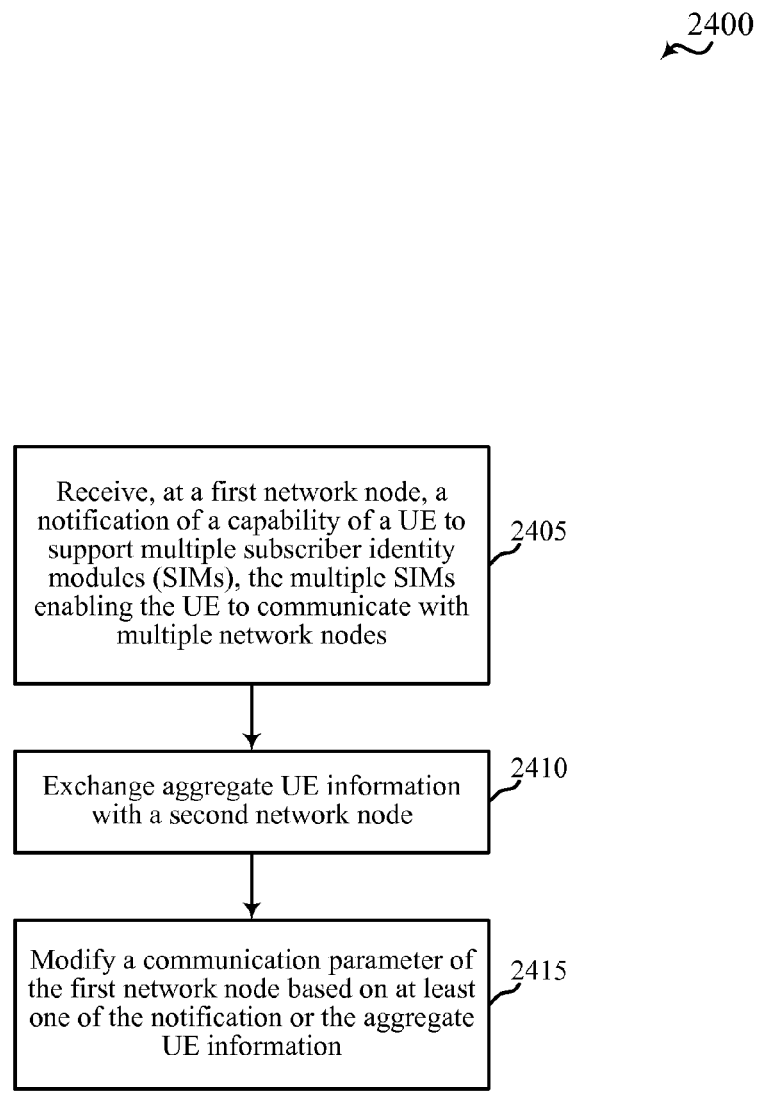
FIG. 24 is a flow chart illustrating an exemplary method for wireless communication, in accordance with various aspects of the present disclosure.

FIG. 24 is a flow chart illustrating an exemplary method 2400 for wireless communication, in accordance with various aspects of the present disclosure. For clarity, the method 2400 is described below with reference to aspects of one or more of the network nodes or base stations 105 described with reference to FIG. 1, 3, 4, 5, 7, 8, 15, or 16, or aspects of one or more of the devices 1115 described with reference to FIG. 11, 12, or 13. In some examples, a base station, network node, or device may execute one or more sets of codes to control the functional elements of the base station, network node, or device to perform the functions described below. Additionally or alternatively, the base station, network node, or device may perform one or more of the functions described below using special-purpose hardware.

At block 2405, the method 2400 may include receiving, at a first network node, a notification of a capability of a UE to support multiple SIMs. The multiple SIMs may enable the UE to communicate with multiple network nodes (e.g., multiple base stations). In some examples, a first SIM of the UE may enable the UE to communicate with the first network node, and a second SIM of the UE may enable the UE to communicate with a second network node. In some cases, the first network node may be associated with a first provider (e.g., a first PLMN or MNO), and the second network node may be associated with a second provider. In some examples, the operation(s) at block 2405 may be performed using the wireless communication management module 1120 described with reference to FIG. 11, 12, 13, 15, or 16, or UE capability determination module 1135 described with reference to FIG. 11, 12, or 13.

At block 2410, the method 2400 may include exchanging aggregate UE information with a second network node. In some embodiments, the first network node may be associated with a first network and the second network node may be associated with a second network. In some cases, the exchanging may include receiving, at the first network node, aggregate UE information from (e.g., compiled by) the second network node. By way of example, the aggregate UE information may be based on a common UE context and/or common sets of UE resource demands. In some examples, the operation(s) at block 2410 may be performed using the wireless communication management module 1120 described with reference to FIG. 11, 12, 13, 15, or 16, or the aggregate UE information exchange module 1315 described with reference to FIG. 13.

At block 2415, the method 2400 may include modifying a communication parameter of the first network node based on the notification of the capability of the UE to support multiple SIMs and/or the aggregate UE information received at block 2410. In some examples, the communication parameter may include at least one of a downlink scheduling parameter, an uplink scheduling parameter, an application prioritization parameter, a performance metric, a radio access technology used by the UE, or a combination thereof. In some examples, modifying the communication parameter may include selecting a radio access technology for at least one of the SIMs, and notifying the UE of the selection. In some examples, modifying the communication parameter may include scheduling a data transmission for the UE based on the aggregate UE information. In some examples, the operation(s) at block 2415 may be performed using the wireless communication management module 1120 described with reference to FIG. 11, 12, 13, 15, or 16, or communication parameter modification module 1140 described with reference to FIG. 11, 12, or 13.

Thus, the method 2400 may provide for wireless communication. It should be noted that the method 2400 is just one implementation and that the operations of the method 2400 may be rearranged or otherwise modified such that other implementations are possible.

In some examples, aspects from two or more of the methods 2100, 2200, 2300, or 2400 described with reference to FIG. 21, 22, 23, or 24 may be combined.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   determining a capability of a user equipment (UE) to support multiple subscriber identity modules (SIMs), the multiple SIMs enabling the UE to communicate with multiple network nodes; and
   notifying at least one network node of the multiple network nodes of the multiple SIM capability of the UE.

2. The method of claim 1, wherein notifying the at least one network node comprises:
   sending an indication of a physical characteristic of the UE associated with the multiple SIMs.

3. The method of claim 2, wherein the physical characteristic comprises at least one of a number of SIMs in the UE, a number of transmit chains available in the UE, a number of receive chains available in the UE, a number of transmit chains available per SIM in the UE, a number of receive chains available per SIM in the UE, an indication of transmit chain sharing, an indication of receive chain sharing, or a combination thereof.

4. The method of claim 1, wherein notifying the at least one network node comprises:
   sending scheduling information associated with the multiple SIMs.

5. The method of claim 4, wherein the scheduling information comprises at least one of uplink scheduling information, downlink scheduling information, power savings scheduling information, or a combination thereof.

6. The method of claim 1, wherein notifying the at least one network node comprises:
   sending at least one of application information associated with the multiple SIMs, impairment information associated with the multiple SIMs, channel information associated with the multiple SIMs, performance information associated with the multiple SIMs, or a combination thereof.

7. The method of claim 6, wherein the application information comprises at least one of applications supported per SIM in the UE, application priority information, an application layer buffer status, an application quality of service (QoS), or a combination thereof.

8. The method of claim 6, wherein the impairment information comprises at least one of a transmit blanking schedule, a receive blanking schedule, or a combination thereof.

9. The method of claim 6, wherein the channel information comprises at least one of a channel estimation, a pathloss, or a combination thereof.

10. The method of claim 6, wherein the performance information comprises at least one of a transmit performance metric, a target transmit blanking rate, a target uplink channel frame error ratio (FER), a receive performance metric, a measured downlink channel block error rate (BLER), a measured downlink channel FER, a measured downlink channel mean opinion score (MOS), a measured downlink channel throughput, a measured downlink channel latency, a measured downlink channel jitter, a semi-static performance metric, a dynamic performance metric, an application-specific performance metric, or a combination thereof.

11. The method of claim 1, wherein notifying the at least one network node comprises:
    indicating a preferred slot for voice communication.

12. The method of claim 11, wherein the preferred slot is based on at least one of a receive parameter of a non-voice transmission, a transmit parameter of a non-voice transmission, or a combination thereof.

13. The method of claim 1, wherein notifying the at least one network node comprises:
    indicating a frame skip pattern for voice applications of the UE.

14. The method of claim 13, further comprising:
    adapting the frame skip pattern based on channel conditions and performance metrics of the multiple network nodes.

15. The method of claim 1, further comprising:
    receiving a response from the at least one network node based on the notification; and
    modifying a communication parameter of the UE based on the response.

16. The method of claim 15, wherein the response from the at least one network node comprises an uplink channel performance metric.

17. The method of claim 15, wherein the communication parameter comprises at least one of a downlink scheduling parameter, an uplink scheduling parameter, a timer, a transmit blanking parameter, a receive blanking parameter, an application prioritization parameter, an RRC state, an MCS-related parameter, a paging occasion, or a combination thereof.

18. The method of claim 1, further comprising:
receiving a coordination message from the at least one network node, the coordination message being based on the notification; and
forwarding the coordination message to at least one other network node of the multiple network nodes, the coordination message being utilized by the at least one other network node to coordinate communications with the UE and the at least one network node.

19. The method of claim 18, wherein the at least one network node is associated with a first provider, and the at least one other network node is associated with a second provider.

20. An apparatus for wireless communication, comprising:
means for determining a capability of a user equipment (UE) to support multiple subscriber identity modules (SIMs), the multiple SIMs enabling the UE to communicate with multiple network nodes; and
means for notifying at least one network node of the multiple network nodes of the multiple SIM capability of the UE.

21. The apparatus of claim 20, wherein the means for notifying the at least one network node comprises:
means for sending an indication of a physical characteristic of the UE associated with the multiple SIMs.

22. The apparatus of claim 20, wherein notifying the at least one network node comprises:
means for sending scheduling information associated with the multiple SIMs.

23. The apparatus of claim 20, wherein the means for notifying the at least one network node comprises:
means for sending at least one of application information associated with the multiple SIMs, impairment information associated with the multiple SIMs, channel information associated with the multiple SIMs, performance information associated with the multiple SIMs, or a combination thereof.

24. The apparatus of claim 20, wherein the means for notifying the at least one network node comprises:
means for indicating a preferred slot for voice communication.

25. The apparatus of claim 20, wherein the means for notifying the at least one network node comprises:
means for indicating a frame skip pattern for voice applications of the UE.

26. The apparatus of claim 20, further comprising:
means for receiving a response from the at least one network node based on the notification; and
means for modifying a communication parameter of the UE based on the response.

27. The apparatus of claim 20, further comprising:
means for receiving a coordination message from the at least one network node, the coordination message being based on the notification; and
means for forwarding the coordination message to at least one other network node of the multiple network nodes, the coordination message being utilized by the at least one other network node to coordinate communications with the UE and the at least one network node.

28. An apparatus for wireless communication, comprising:
a subscriber identity (SIM) management module to determine a capability of a user equipment (UE) to support multiple SIMs, the multiple SIMs enabling the UE to communicate with multiple network nodes; and
a UE capability notification module to notify at least one network node of the multiple network nodes of the multiple SIM capability of the UE.

29. The apparatus of claim 28, further comprising:
a response processing module to receive a response from the at least one network node based on the notification; and
a communication parameter management module to modify a communication parameter of the UE based on the response.

30. A non-transitory computer-readable medium storing computer-executable code for wireless communication, the code executable by a processor to:
determine a capability of a user equipment (UE) to support multiple subscriber identity modules (SIMs), the multiple SIMs enabling the UE to communicate with multiple network nodes; and
notify at least one network node of the multiple network nodes of the multiple SIM capability of the UE.

* * * * *